US010770920B2

(12) United States Patent
Morita

(10) Patent No.: US 10,770,920 B2
(45) Date of Patent: Sep. 8, 2020

(54) WIRELESS POWER TRANSMISSION SYSTEM, CONTROL METHOD, AND STORAGE MEDIUM

(71) Applicant: CANON KABUSHIKI KAISHA, Tokyo (JP)

(72) Inventor: Jun Morita, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 108 days.

(21) Appl. No.: 15/633,410

(22) Filed: Jun. 26, 2017

(65) Prior Publication Data

US 2018/0006497 A1    Jan. 4, 2018

(30) Foreign Application Priority Data

Jun. 30, 2016 (JP) ................. 2016-130602
Dec. 27, 2016 (JP) ................. 2016-253864

(51) Int. Cl.
| H02J 50/12 | (2016.01) |
| H02J 50/23 | (2016.01) |
| H02J 50/27 | (2016.01) |
| H02J 50/80 | (2016.01) |
| H04B 5/00 | (2006.01) |

(52) U.S. Cl.
CPC ............. *H02J 50/12* (2016.02); *H02J 50/23* (2016.02); *H02J 50/27* (2016.02); *H02J 50/80* (2016.02); *H04B 5/0037* (2013.01); *H04B 5/0075* (2013.01)

(58) Field of Classification Search
CPC .. H02J 50/12; H02J 50/27; H02J 50/23; H02J 50/80; H04B 5/0075; H04B 5/0037
See application file for complete search history.

(56) References Cited

FOREIGN PATENT DOCUMENTS

| CN | 101164323 A | 4/2008 | |
| CN | 103683525 A | 3/2014 | |
| JP | 2013-014056 A | * 1/2013 | ............. B41J 29/00 |
| JP | 2013-014056 A | 1/2013 | |

* cited by examiner

*Primary Examiner* — Jung Kim
(74) *Attorney, Agent, or Firm* — Canon U.S.A., Inc. I.P. Division

(57) ABSTRACT

A wireless power transmission system includes a first antenna, a second antenna configured to perform wireless power transmission with the first antenna, and a movement unit configured to move a position of the second antenna relative to the first antenna in a predetermined moving direction, wherein the second antenna is shorter in length in the moving direction than the first antenna, wherein a distance between at least one end portion of the first antenna in the moving direction and the second antenna at a position where the second antenna faces the end portion is longer than a distance between an intermediate portion of the first antenna and the second antenna at a position where the second antenna faces the intermediate portion, and wherein the intermediate portion of the first antenna is a portion of the first antenna excluding both end portions of the first antenna.

12 Claims, 22 Drawing Sheets

FIG.10
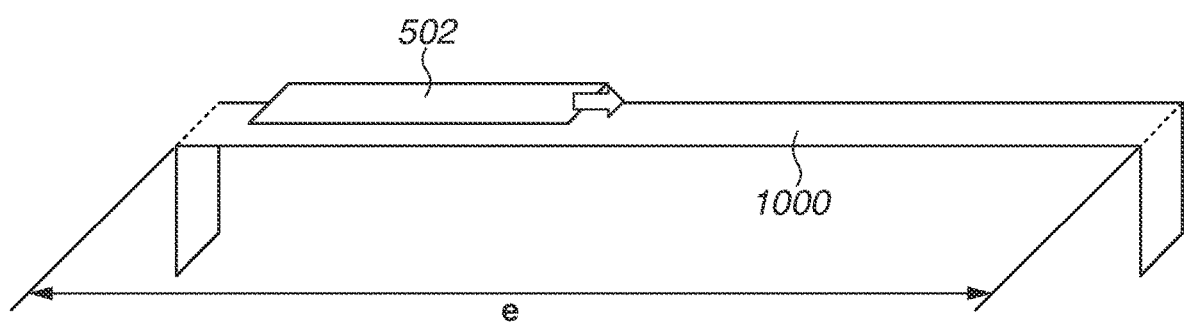
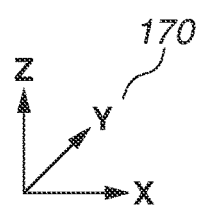

FIG.16
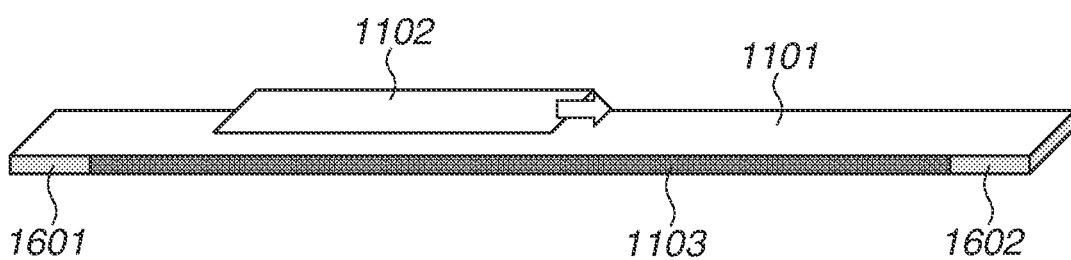
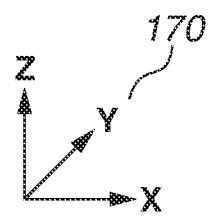

WIRELESS POWER TRANSMISSION SYSTEM, CONTROL METHOD, AND STORAGE MEDIUM

BACKGROUND

Field

The present disclosure relates to a wireless power transmission system, a control method, and a storage medium.

Description of the Related Art

In recent years, a wireless power transmission system for wirelessly transmitting power to a moving apparatus has been proposed. Japanese Patent Application Laid-Open No. 2013-014056 discusses a technique for wirelessly transmitting power from a long coil-shaped power transmission antenna installed on the housing of a printer to a coil-shaped power reception antenna installed an the print head moving within the printer.

However, in a case where the position of one of the two antennas for performing wireless power transmission is moved relative to the other antenna, it is possible for power transmission efficiency to become unstable. For example, in a wireless power transmission system discussed in Japanese Patent Application Laid-Open No. 2013-014056, the coupling factor between the two antennas may be different in a case where the power reception antenna faces an end portion of the power transmission antenna versus a case where the power reception antenna faces an intermediate portion of the power transmission antenna. Accordingly, it is possible that the power transmission efficiency may change with a movement of the power reception antenna.

SUMMARY OF THE INVENTION

According to various embodiments of the present disclosure, a wireless power transmission system includes a first antenna, a second antenna configured to perform wireless power transmission with the first antenna, and a movement unit configured to move a position of the second antenna relative to the first antenna in a predetermined moving direction, wherein the second antenna is shorter in length in the moving direction than the first antenna, wherein a distance between at least one end portion of the first antenna in the moving direction and the second antenna at a position where the second antenna faces the end portion is longer than a distance between an intermediate portion of the first antenna and the second antenna at a position where the second antenna faces the intermediate portion, and wherein the intermediate portion of the first antenna is a portion of the first antenna excluding both end portions of the first antenna.

Further features of various embodiments will become apparent from the following description of exemplary embodiments with reference to the attached drawings.

BRIEF DESCRIPTION OF THE DRAWINGS

FIG. 10 illustrates a power transmission antenna and a power reception antenna according to an exemplary embodiment.

FIG. 16 illustrates a power transmission antenna and a power reception antenna according to an exemplary embodiment.

DESCRIPTION OF THE EMBODIMENTS

[System Configuration]

Figure 1:
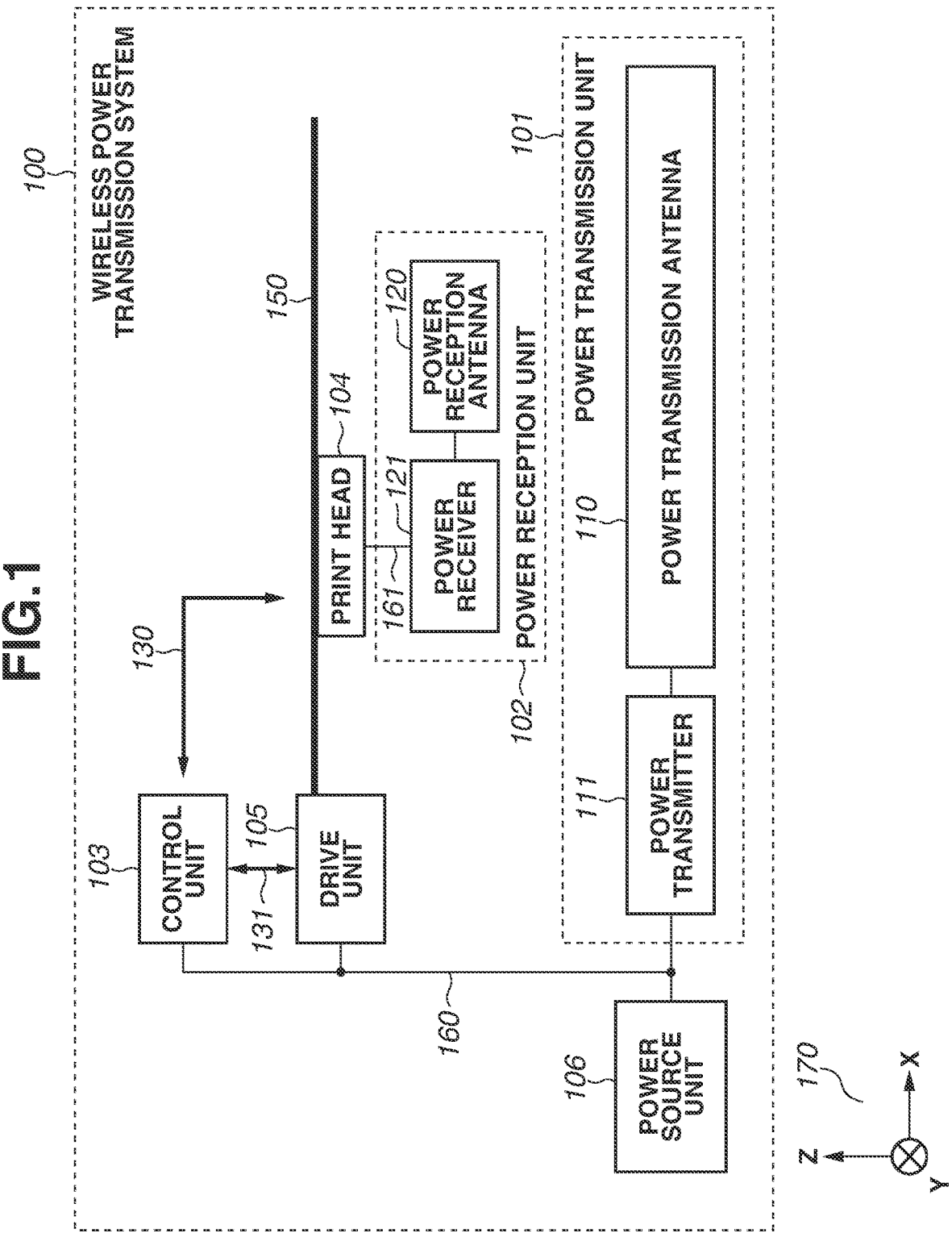
FIG. 1 illustrates a system configuration of a wireless power transmission system according to an exemplary embodiment.

Exemplary embodiments will be described below with reference to the accompanying drawings. FIG. 1 illustrates a system configuration of a wireless power transmission system 100 (hereinafter, referred to as a system 100) according to the first exemplary embodiment. FIG. 1 illustrates the wireless power transmission system 100 viewed from the Y-axis direction of a coordinate system 170 defined by the X-, Y-, and Z-axes perpendicularly intersecting with each other.

The system 100 includes a power transmission unit 101, a power reception unit 102, a control unit 103, a print head 104, a drive unit 105, a power source unit 106, a rail 150, and transmission paths 130, 131, 160, and 161. The power transmission unit 101 includes a power transmission antenna 110 and a power transmitter 111. The power reception unit 102 includes a power reception antenna 120 and a power receiver 121.

According to the present exemplary embodiment, the system 100 is included in a printer, and power transmitted from the power transmission antenna 110 to the power reception antenna 120 is used to control the ink discharge at the print head 104 in the printer. For example, when the print head 104 performs the ink discharge based an a piezoelectric method, the transmitted power is used for voltage application to a piezoelectric element. For example, when the print head 104 performs the ink discharge based on a thermal method, the transmitted power is used for heating by a heater. Under this discharge control, ink supplied from an ink tank attached to the printer to the print head 104 is discharged onto a recording medium such as paper conveyed inside the printer and an image is formed on the recording medium. In this case, when the print head 104 moves in a direction perpendicular to the conveyance direction of the recording medium and discharges ink, an image can be formed on the entire recording medium. More specifically, the printer performs printing by alternately or simultaneously repeating the movement of the print head 104 and ink discharge, and the conveyance of paper.

However, the application target of the system 100 is not limited thereto. For example, the system 100 is applicable to power transmission to an Automatic Guided Vehicle (AGV) used at a factory, power transmission in the light emitting diode (LED) unit of an image scanner, and power transmission to general moving bodies moving in a predetermined direction and requiring power supply. When applying the system 100 to power transmission to an AGV, for example, the power transmission unit 101 installed an the ground wirelessly transmits power to the power reception unit 102 mounted on the AGV. When applying the system 100 to an apparatus other than a printer, the system 100 does not need to include the print head 104 or the rail 150.

According to the present exemplary embodiment, wireless power transmission between the power transmission antenna 110 and the power reception antenna 120 is based on an electromagnetic induction method or a magnetic field resonance method. In this case, the electromagnetic induction method and the magnetic field resonance method may be selectively used, and other methods may be used instead.

According to the present exemplary embodiment, the coil-shaped power transmission antenna 110 wirelessly transmits power to the coil-shaped power reception antennas 120. The power transmission antenna 110 and the power reception antenna 120 may comprise a coil provided on a dielectric substrate, such as Frame Retardant Type 4 (FR4), or comprise a coil formed by winding a litz wire. The configuration is not limited thereto, and other configurations having a coil are also applicable. The power transmitter 111 has a known power transmission circuit used for wireless power transmission based on an electromagnetic induction method or a magnetic field resonance method. More specifically, the power transmitter 111 converts a direct-current (DC) voltage supplied from the power source unit 106 into an alternating current (AC) voltage having a frequency suitable for power transmission by using a switching circuit and applies the voltage to the coil configuring the power transmission antenna 110. More specifically, in the power transmission unit 101, the power transmitter 111 converts a DC voltage into an AC voltage and the power transmission antenna 110 generates an AC magnetic field.

The system 100 includes two antennas, the power transmission antenna 110 and the power reception antenna 120. The power transmission antenna 110 wirelessly transmits power to the power reception antenna 120. The number of antennas in the system 100 is not limited thereto. The system 100 may include (i) one power transmission antenna 110 and a plurality of power reception antennas 120, (ii) a plurality of power transmission antennas 110 and one power reception antenna 120, or (iii) a plurality of power transmission antennas 110 and a plurality of power reception antennas 120.

When viewed from a reference direction (Z-axis direction) perpendicular to the X-axis direction in the coordinate system 170, the power reception antenna 120 is positioned so as to at least partly overlap with the power transmission antenna 110. In other words, when the power transmission antenna 110 and the power reception antenna 120 are projected on a reference plane (XY plane) parallel to the X-axis direction, the inside of the loop of the coil configuring the power transmission antenna 110 at least partly overlaps with the inside of the loop of the coil configuring the power reception antenna 120.

Figure 5:
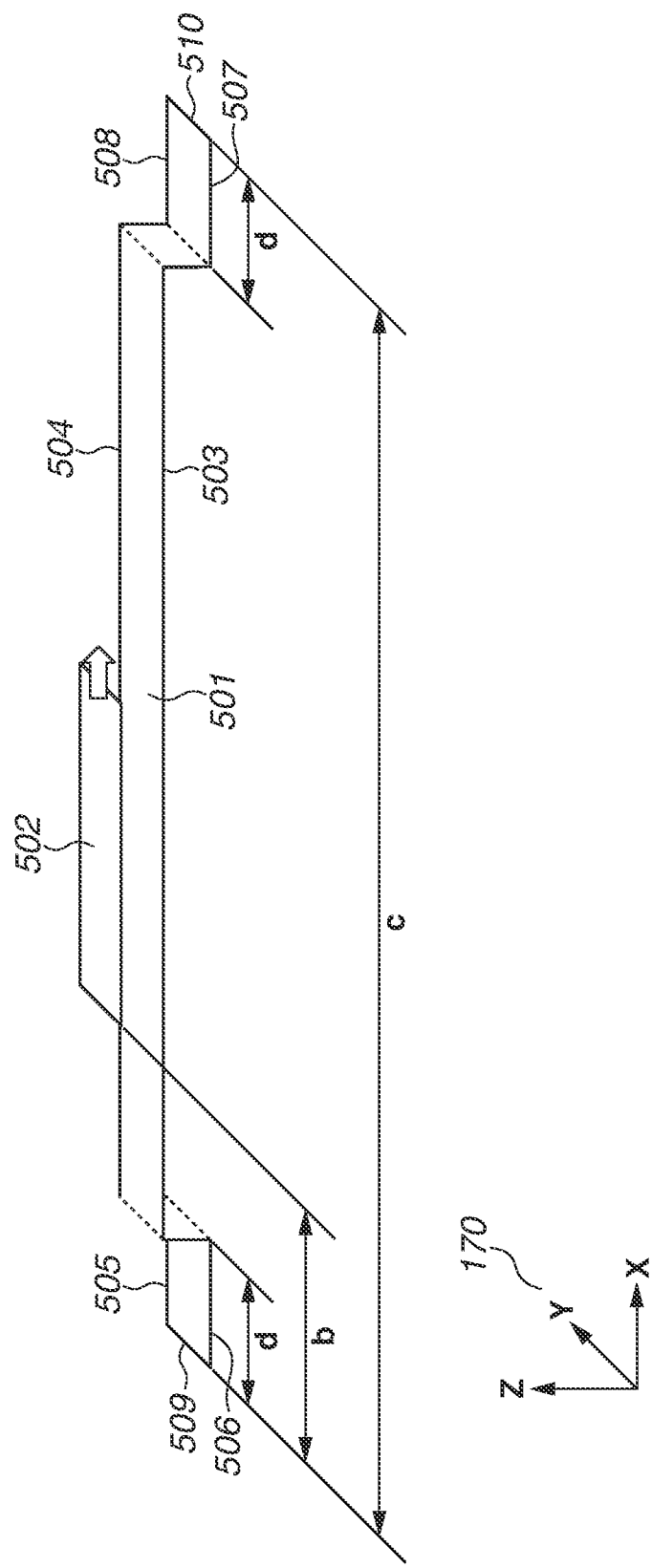
FIG. 5 illustrates a power transmission antenna and a power reception antenna according to an exemplary embodiment.

Since the power reception unit 102 is physically fixed to the print head 104, the power reception antenna 120 is movable in the X-axis direction in association with the print head 104 sliding on the rail 150. Thus, the position of the power reception antenna 120 relative to the power transmission antenna 110 is variable in the X-axis direction. The power transmission antenna 110 is considered to be longer in length in the X-axis direction than the power reception antenna 120. More specifically, the loop formed by the coil of the power transmission antenna 110 is larger in the outer diameter in the moving direction of the power reception antenna 120 than the loop formed by the coil of the power reception antenna 120. For the purpose of increasing the coupling factor between the two antennas, the power reception antenna 120 is equal in length in the Y-axis direction to the power transmission antenna 110. However, the configuration is not limited thereto. The power reception antenna 120 may be different in length in the Y-axis direction from the power transmission antenna 110. FIG. 5 illustrates examples of the power transmission antenna 501 and the power reception antenna 502 according to the present exemplary embodiment. The examples illustrated in FIG. 5 will be described in detail below.

The power receiver 121 has a known power reception circuit used for wireless power transmission based on an electromagnetic induction method or a magnetic field resonance method. The power receiver 121 outputs to the print head 104 the power generated in the power reception antenna 120 according to application of a voltage to the power transmission antenna 110 by the power transmitter 111. More specifically, the power receiver 121 converts an AC voltage generated in the power reception antenna 120 from the AC magnetic field into a DC voltage by using a rectification circuit, converts the DC voltage into a suitable voltage by using a voltage conversion circuit, and supplies power to the print head 104 via the transmission path 161. More specifically, in the power reception unit 102, the power reception antenna 120 receives power based on the AC magnetic field generated by the power transmission unit 101, and the power receiver 121 converts the AC voltage into a DC voltage and outputs power. Wireless power supply to the print head 104 is implemented by the above-described configuration.

The control unit 103 is connected to the print head 104 via the transmission path 130 to control the print head 104. The control unit 103 is also connected to the drive unit 105 via the transmission path 131 to control the drive unit 105. The print head 104 discharges ink based on a control signal transmitted from the control unit 103 via the transmission path 130 to record texts and images on media such as paper. The drive unit 105 moves the print head 104 along the rail 150 based an a control signal transmitted from the control unit 103 via the transmission path 131. The print head 104 and the power reception antenna 120 move in association with each other. Accordingly, the drive unit 105 moves the print head 104 and at the same time also moves the position of the power reception antenna 120 relative to the power transmission antenna 110 in the X-axis direction in the coordinate system 170. The power source unit 106 generates DC voltages suitable for the power transmission unit 101, the control unit 103, and the drive unit 105 from a commercial power source (not illustrated) and supplies power to these units via the transmission path 160.

The present exemplary embodiment will be described below based on the premise that the power received by the power reception unit 102 is used to control the ink discharge from the print head 104 and that the movement control of the print head 104 is performed by the drive unit 105 by using power supplied from the power source unit 106. However, the configuration is not limited thereto. The print head 104 itself may have a mechanism for moving along the rail 150, and the power received by the power reception unit 102 may be used to move the print head 104. In this case, the print head 104 may move within a range in which power can be transmitted from the power transmission unit 101 to the power reception unit 102. The power reception unit 102 may have a battery for accumulating the received power, and the print head 104 may move by using the power accumulated in the battery within a range in which power is not transmitted from the power transmission unit 101 to the power reception unit 102.

The transmission paths 130, 131, 160, and 161 may be either wired or wireless transmission paths. Using a wireless transmission path as the transmission path 130 enables avoiding the fatigue of cables caused by repetitive movement of the print head 104. A wireless transmission path may be implemented by using a technology conforming to Wi-Fi or other standards or by using an original wireless technology.

[Conditions of Highly Efficient Power Transmission]

When performing wireless power transmission, impedance matching between antennas is required to improve power transmission efficiency. In particular, to implement efficient power transmission in the system 100 in which the power reception antenna 120 moves as described above, it is required that impedance matching is not largely disrupted even while the power reception antenna 120 is moving.

Figure 2:
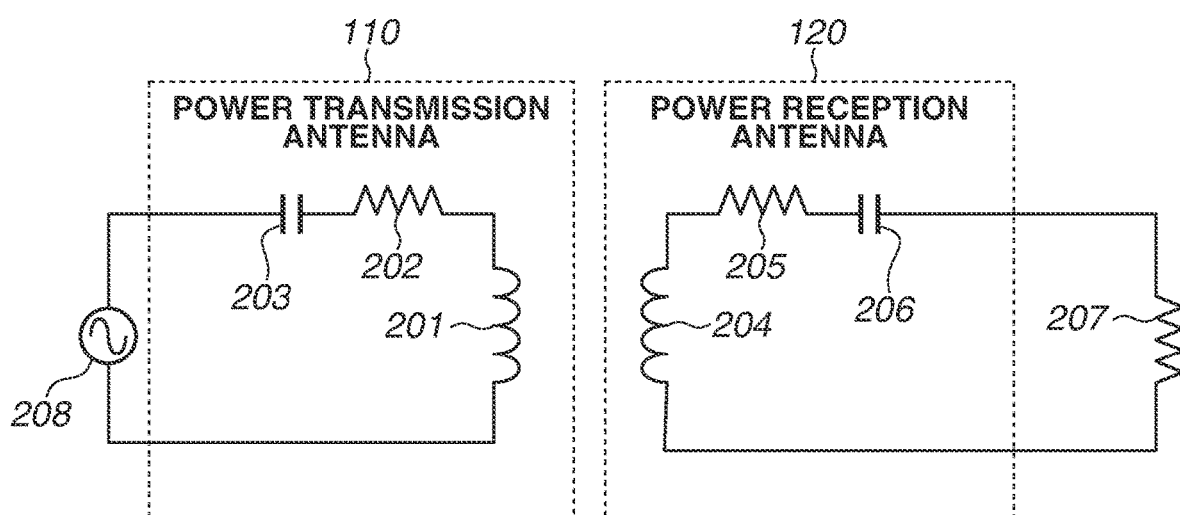
FIG. 2 is a circuit diagram illustrating a circuit configuration of a power transmission antenna and a power reception antenna according to an exemplary embodiment.

FIG. 2 illustrates equivalent circuits of the power transmission unit 101 and the power reception unit 102. The power transmission antenna 110 is composed of an inductor 201, a resistance component 202, and a capacitor 203 which resonates with the inductor 201. The power reception antenna 120 is composed of an inductor 204, a resistance component 205, and a capacitor 206 which resonates with the inductor 204. A resistance component 207 corresponds to the input impedance of the power receiver 121, and the power source 208 corresponds to the power transmitter 111.

In the circuit configuration illustrated in FIG. 2, the condition represented by Formula 1 below needs to be satisfied to implement efficient power transmission. More specifically, when the condition represented by Formula 1 is satisfied, impedance matching between antennas is achieved.

[Formula 1]

$$R = r_2 \sqrt{1 + r_m^2} \qquad \text{(Formula 1)}$$

[Formula 2]

$$f_m^2 = k^2 Q_1 Q_2 \qquad \text{(Formula 2)}$$

Referring to Formula 1, R denotes the input impedance of the power receiver 121, and r2 denotes the resistance component 205 of the power reception antenna 120. $f_m^2$ is a product of the Q value ($Q_1$) of the power transmission antenna 110, the Q value ($Q_2$) of the power reception antenna 120, and the square of the coupling factor (k) between antennas, as represented by formula 2. Since $r_2$, $Q_1$, and $Q_2$ are uniquely determined by the material and shape of the antennas, these values are considered to be constant in the present exemplary embodiment. The input impedance R is also considered to be constant. As represented by Formula 1, when the coupling factor k between antennas largely changes with change in positional relation between the power transmission antenna 110 and the power reception antenna 120. In such a case, impedance matching will be disrupted resulting in an unstable power transmission efficiency.

The system 100 according to the present exemplary embodiment is configured to prevent change in the coupling factor between antennas due to the movement of the power reception antenna 120. This configuration will be described in detail below. This configuration enables stable power transmission even while the power reception antenna 120 is moving. In comparison with a method for adding a circuit for dynamic impedance adjustment to the power transmission unit 101 and the power reception unit 102, the above-described configuration makes it possible to reduce the size of the system 100 because no additional circuitry is required. Accordingly, the system 100 can be mounted on a small-sized apparatus.

[Configuration of Antennas]

Figure 3:
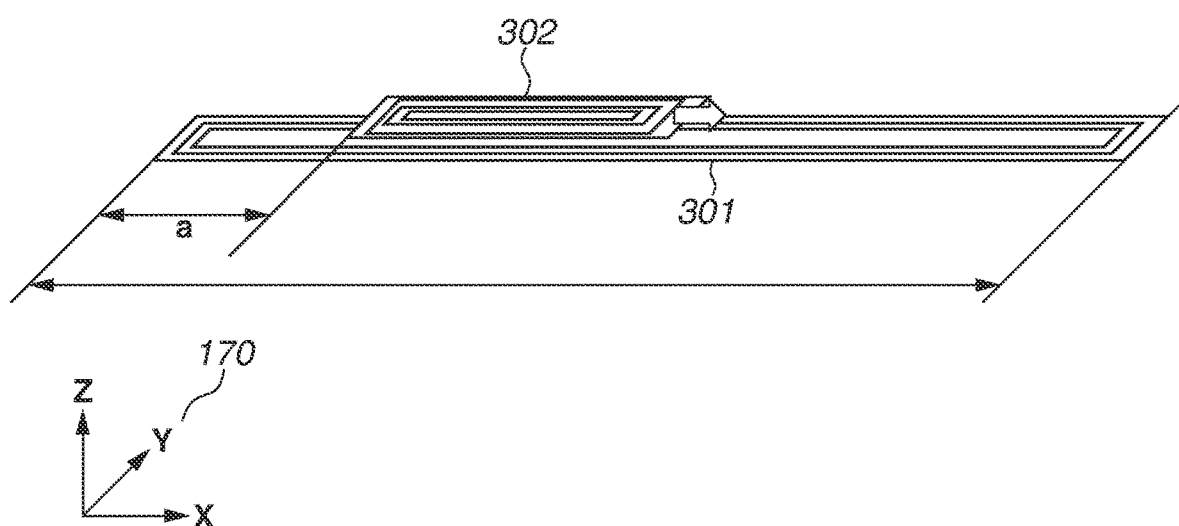
FIG. 3 illustrates a power transmission antenna and a power reception antenna in a conventional wireless power transmission system.
Figure 4:
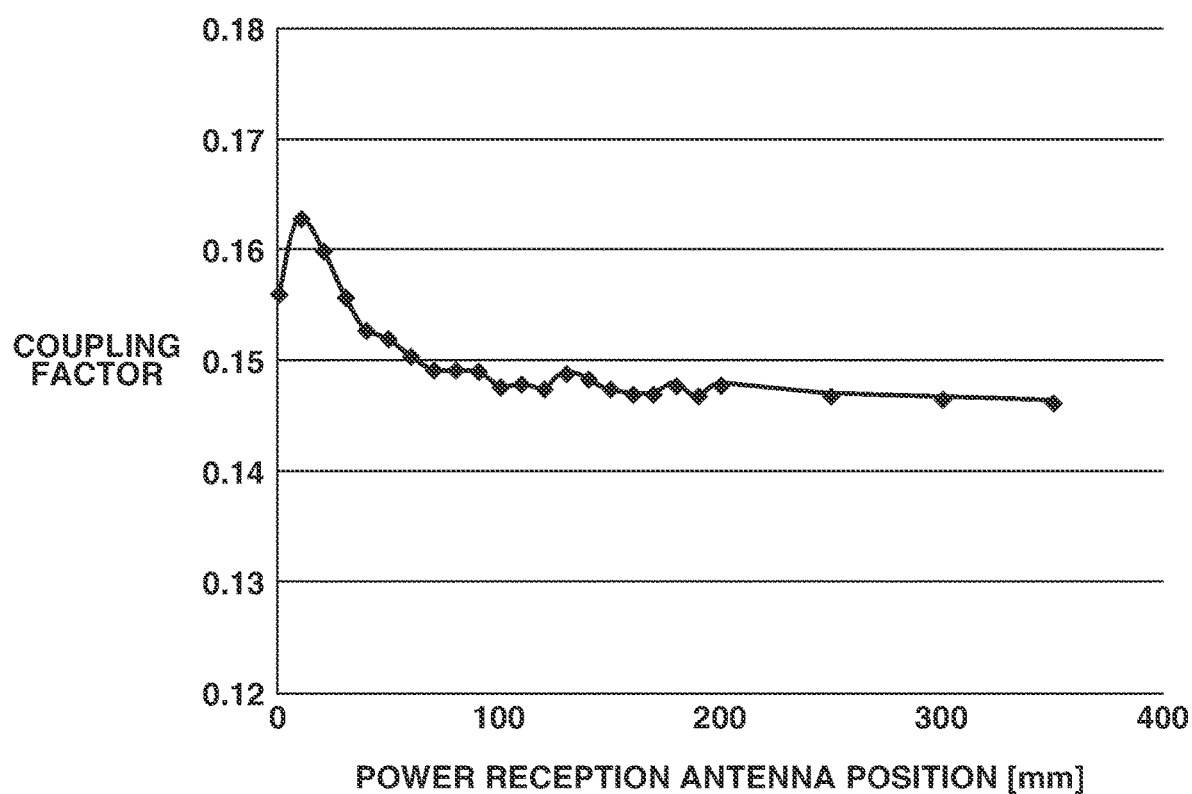
FIG. 4 illustrates a relation between a relative position between a first antenna and a second antenna, and a coupling factor between the two antennas, in the conventional wireless power transmission system.

FIG. 3 illustrates a power transmission antenna 301 and a power reception antenna 302 as examples of antennas implemented by conventional techniques. The power transmission antenna 301 and the power reception antenna 302 are coil-shaped. The power reception antenna 302 is movable in the X-axis direction in the coordinate system 170. FIG. 4 is a graph illustrating a result of a simulation for obtaining the relation between the relative position and the coupling factor between the power transmission antenna 301 and the power reception antenna 302 illustrated in FIG. 3. The vertical axis denotes the coupling factor between antennas, and the horizontal axis denotes the position of the power reception antenna 302 relative to the power transmission antenna 301 in the X-axis direction (hereinafter referred to as a power reception antenna position). The power reception antenna position is represented by the distance (corresponding to a range a illustrated in FIG. 3) between an edge of the power transmission antenna 301 in the X-axis direction and an edge of the power reception antenna 302 in the X-axis direction. For example, when the power reception antenna position is 0 mm, the edge of the power transmission antenna 301 overlaps with the edge of the power reception antenna 302 when viewed in the Z-axis direction. The power reception antenna 302 moves on the power transmission antenna 301. More specifically, in the moving range of the power reception antenna 302, the power reception antenna 302 overlaps with the power transmission antenna 301 when viewed from the Z-axis direction. In the simulation illustrated in FIG. 4, the power transmission antenna 301 is 800 mm long in the X-axis direction and 70 mm wide in the Y-axis direction. The power reception antenna 302 is 100 mm long in the X-axis direction and 70 mm wide in the Y-axis direction. Both the power transmission antenna 301 and the power reception antenna 302 have a number of turns of 1 (1 turn). For ease of understanding, FIG. 3 illustrates the shapes of the power transmission antenna 301 and the power reception antenna 302 having a number of turns of 2 or more.

As illustrated in FIG. 4, the coupling factor between the two antennas is high when the power reception antenna 302 is positioned in the vicinity of an end portion of the power transmission antenna 301, and decreases as the power reception antenna 302 approaches the center of the power transmission antenna 301. Referring to FIG. 4, the difference between the maximum and minimum values of the coupling factor is about 0.0165. The coupling factor changes with change in position of the power reception antenna 302 in this way. Accordingly, for example, if a circuit is designed so that impedance matching is achieved when the coupling factor is maximized, impedance matching will be largely disrupted when the coupling factor is minimized. If impedance matching is disrupted, the power transmission efficiency decreases.

FIG. 5 illustrates examples of the power transmission antenna 501 and the power reception antenna 502 having shapes for preventing change in the coupling factor included in the system 100 according to the present exemplary embodiment. The power reception antenna 502 has a similar shape to that of the power reception antenna 302 illustrated in FIG. 3. The power transmission antenna 501 has a plurality of linear portions, i.e., conductor portions 503, 504, 505, 506, 507, 508, 509, and 510.

As illustrated in FIG. 5, the power transmission antenna 501 is a long coil having long sides approximately parallel in the X-axis direction in the coordinate system 170. The conductor portions 505, 506, 507, 508, 509, and 510 are more distant to the power reception antenna 502 in the Z-axis direction than the conductor portions 503 and 504. More specifically, the power transmission antenna 501 is shaped in such a way that the distance between each end portion in the X-axis direction and the power reception antenna 502 closest to the end portion is longer than the distance between the intermediate portion in the X-axis direction and the power reception antenna 502 closest to the intermediate portion.

Referring to FIG. 5, both end portions of the power transmission antenna 501 in the X-axis direction refer to the portion corresponding to the conductor portions 505, 506, 507, and 508. More specifically, each end portion of the power transmission antenna 501 in the X-axis direction refers to a portion corresponding to a range from the conductor portion 509 or 510 existing at each edge in the X-axis direction toward the inside of the power transmission antenna 501 within a predetermined distance. Further, the end portion of the power transmission antenna 501 in the X-axis direction is also a part of the power transmission antenna 501 overlapping with the power reception antenna 502 when viewed from the Z-axis direction when the power reception antenna 502 moves to the edge of a movable range in the X-axis direction. The intermediate portion of the power transmission antenna 501 in the X-axis direction refers to the portion other than both end portions of the power transmission antenna 501 and the portion corresponding to the conductor portions 503 and 504. More specifically, the intermediate portion of the power transmission antenna 501 in the X-axis direction refers to the portion away from both edges of the power transmission antenna 501 in the X-axis direction by a predetermined distance or longer. The stability of the coupling factor between antennas depends a method for determining the predetermined distance (length of each end portion). The method will be described below with reference to FIG. 7

Figure 6:
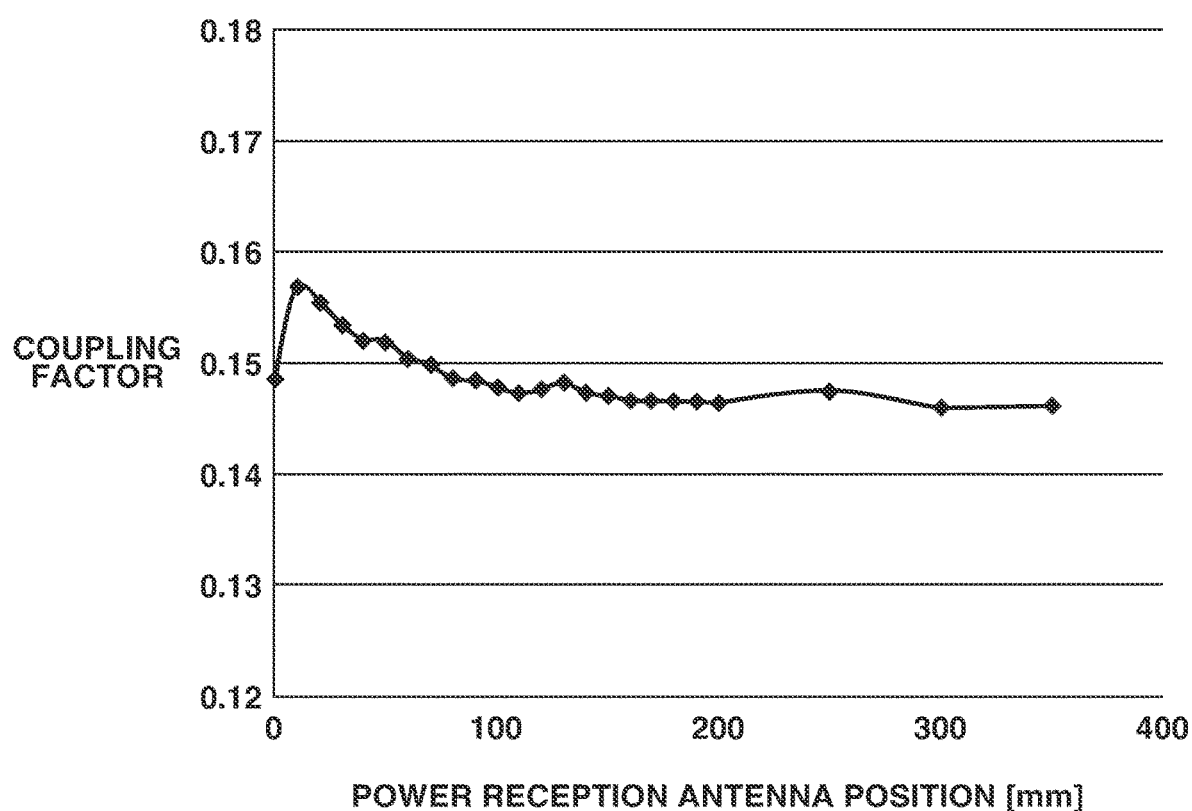
FIG. 6 illustrates a relation between a relative position between a first antenna and a second antenna, and a coupling factor between the two antennas, according to an exemplary embodiment.

The power reception antenna 502 moves in the vicinity of the power transmission antenna 501 in the X-axis direction so that the plane surrounded by the power reception antenna 502 at least partly overlaps with the plane surrounded by the power transmission antenna 501 when viewed from the Z-axis direction FIG. 6 illustrates a result of a simulation related to change in the coupling factor when the power reception antenna 502 moves in the X-axis direction. The vertical axis denotes the coupling factor between antennas, and the horizontal axis denotes the power reception antenna position in the X-axis direction (corresponding to a range b illustrated in FIG. 5). Similar to the power transmission antenna 301 illustrated in FIG. 3, the power transmission antenna 501 is 800 mm long in the X-axis direction and 70 mm wide in the Y-axis direction. The length of the power transmission antenna 501 refers to the distance between the conductor portions 509 and 510 in the X-axis direction (corresponding to a range c illustrated in FIG. 5). Each of the conductor portions 505, 506, 507, and 508 is 50 mm long. The power reception antenna 502 is 100 mm long in the X-axis direction and 70 mm wide in the Y-axis direction. Both the power transmission antenna 501 and the power reception antenna 502 have a number of turns of 1 (1 turn).

As illustrated. in FIG. 6, the coupling factor is high when the power reception antenna 502 is positioned in the vicinity of an end portion of the power transmission antenna 501, and decreases as the power reception antenna 502 approaches the center of the power transmission antenna 501. However, the coupling factor between antennas when the power reception antenna 502 is positioned in the vicinity of an end portion of the power transmission antenna 501 is smaller than that between conventional antennas in a similar state to the one illustrated in FIG. 4. Referring to FIG. 6, the difference between the maximum and minimum values of the coupling factor is about 0.010. More specifically, the amount of change in the coupling factor with the movement of the power reception antenna 502 can be reduced by using the power transmission antenna 501 according to the present exemplary embodiment instead of the conventional power transmission antenna 301. As a result, it becomes possible to prevent the reduction in the power transmission efficiency based on a change in the positional relation between the two antennas.

Figure 7:
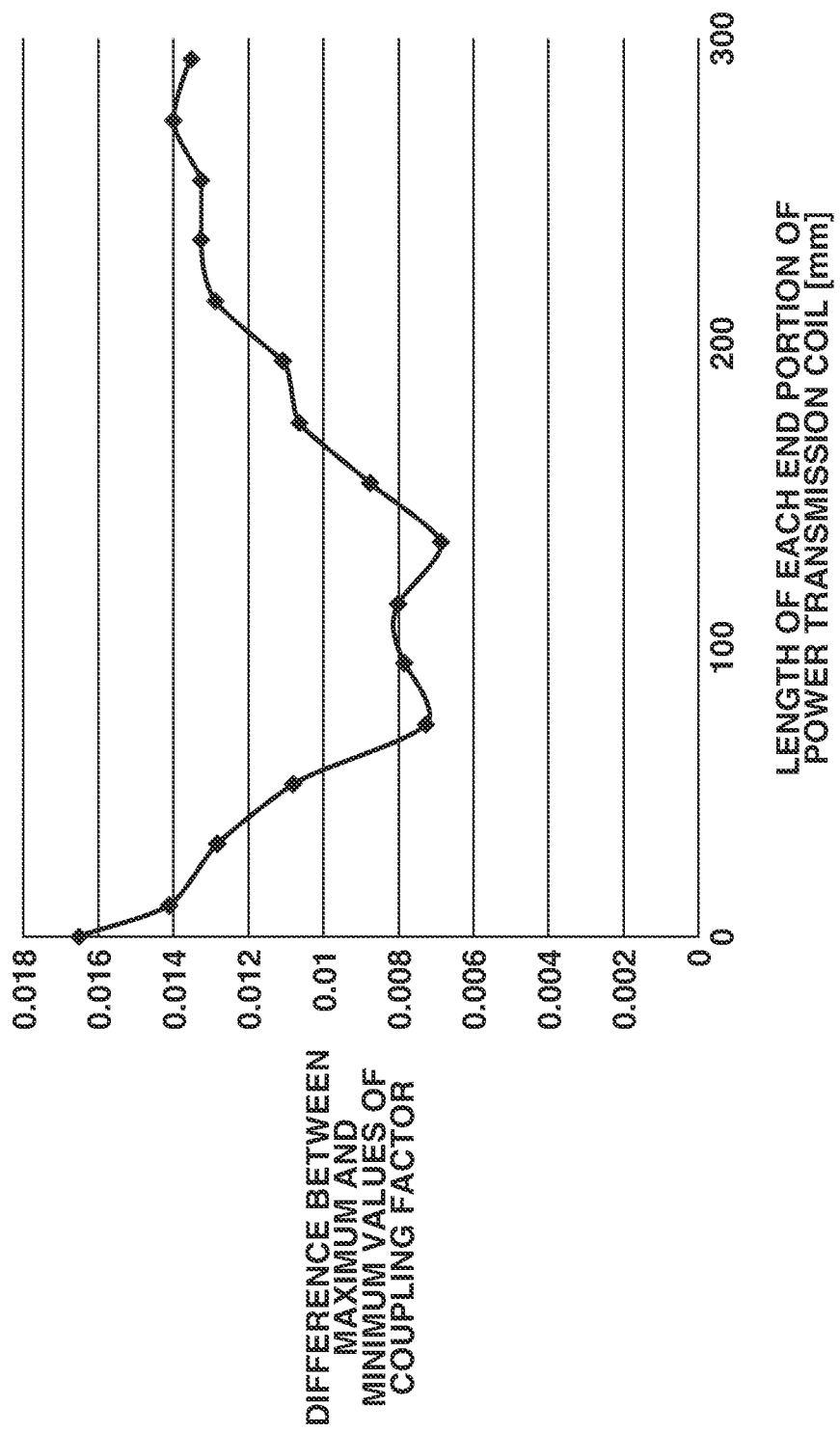
FIG. 7 illustrates a difference between a maximum value and a minimum value of a coupling factor.

FIG. 7 illustrates a result of a simulation related to change in the difference between the maximum and minimum values of the coupling factor when the length of the power transmission antenna 501 is fixed to 800 mm and the Length of each end portion of the power transmission antenna 501 in the X-axis direction (corresponding to a range d illustrated. FIG. 5) is changed from 0 to 300 mm. As illustrated in FIG. 7, when each end portion of the power transmission antenna 501 is 50 to 200 mm long, the difference between the maximum and minimum values of the coupling factor is small. Further, when each end portion of the power transmission antenna 501 is 80 to 140 mm long, the difference between the maximum and minimum values of the coupling factor is particularly small. The relation between the length of each end portion of the power transmission antenna 501 and the difference between the maximum and minimum values of the coupling factor is determined by the length of the power reception antenna 502 in the X-axis direction. More specifically, the coupling factor between antennas is stable when the length of the end portion of the power transmission antenna 501 in the X-axis direction is about half to twice the length of the power reception antenna 502 in the X-axis direction. Further, the coupling factor between antennas is particularly stable when the length of the end portion of the power transmission antenna 501 in the X-axis direction is about $4/5$ to $7/5$ times the length of the power reception antenna 502 in the X-axis direction.

Figure 8:
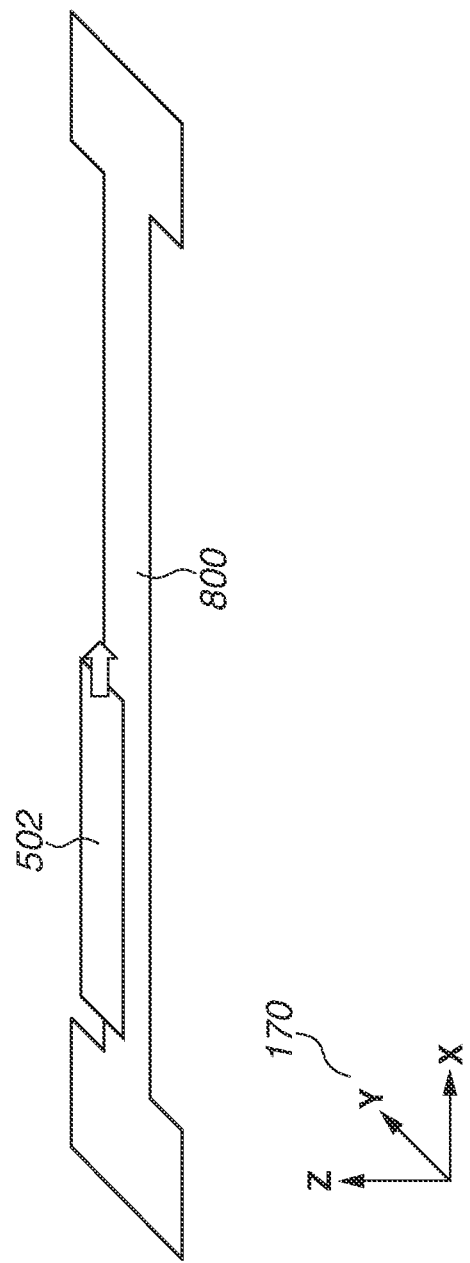
FIG. 8 illustrates a power transmission antenna and a power reception antenna according to an exemplary embodiment.

Referring to FIG. 5, the power transmission antenna 501 is shaped in such a way that the distance between the power transmission antenna 501 and the power reception antenna 502 in a direction (Z-axis direction) perpendicular to the plane where the power reception antenna 502 exists at the intermediate portion is longer than that at each end portion of the power transmission antenna 501 in the X-axis direction. On the other hand, as illustrated in FIG. 8, the distance between the power transmission antenna 800 and the power reception antenna 502 in a direction (Y-axis direction) parallel to the plane where the power reception antenna 502 exists and perpendicular to the X-axis direction at the intermediate portion may be longer than that at each end portion of the power transmission antenna 800 in the X-axis direction. Using the thus-shaped power transmission antenna 800 also enables obtaining a similar effect to that in a case of using the power transmission antenna 501. When the power transmission antenna 110 must be small in width in the Z-axis direction because of restrictions on an apparatus on which the system 100 is to be mounted, the use of the power transmission antenna 800 is effective. The power transmission antenna may be shaped in such a way that both the distance between the power transmission antenna and the power reception antenna in the Z-axis direction and the distance therebetween in the Y-axis direction at the intermediate portion may be longer than the distances at each end portion of the power transmission antenna in the X-axis direction.

Figure 9:
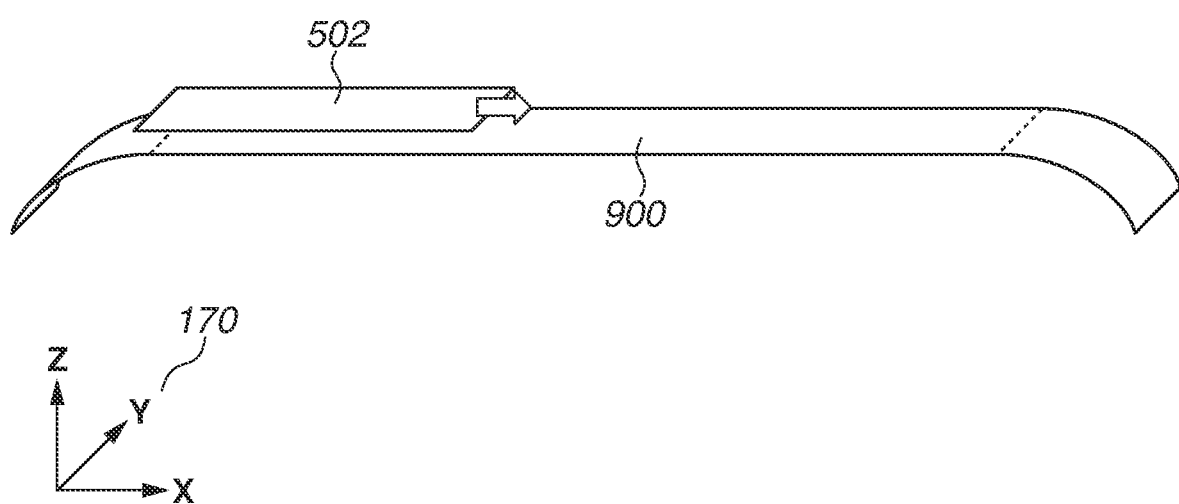
FIG. 9 illustrates a power transmission antenna and a power reception antenna according to an exemplary embodiment.

Referring to FIG. 5, the power transmission antenna 501 is shaped in such a way that the boundary between the each end portion and the intermediate portion in the X-axis direction is bent in step form in the Z-axis direction. The boundary between the each end portion and the intermediate portion of the power transmission antenna 501 in the X-axis direction refers to the portion away by a predetermined distance from the conductor portion 509 or 510 existing at each edge of the power transmission antenna 501 in the X-axis direction. However, the shape of the power transmission antenna 501 is not limited thereto. For example, as illustrated in FIG. 9, each end portion of the power transmission antenna 900 in the X-axis direction may be bent in a curved shape in the Z-axis direction. For example, as illustrated in FIG. 10, the boundary between each end and the intermediate portion of the power transmission antenna 1000 may be bent so that the end portion may not be parallel to the intermediate portion. Using the power transmission antenna 900 or the power transmission antenna 1000 also enables obtaining a similar effect to that obtained in a case of using the power transmission antenna 501. However, when using the power transmission antenna 501, the coupling factor is stable in a situation where the power reception antenna 502 is entirely included in the power transmission antenna 501 in the X-axis direction (within the range c illustrated in FIG. 5 when viewed from the Z-axis). On the other hand, when using the power transmission antenna 1000, the coupling factor is stable in a situation where the power reception antenna 502 is entirely included in the intermediate portion of the power transmission antenna 1000 the X-axis direction (within a range e illustrated in FIG. 10 when viewed from the Z-axis direction).

Referring to FIG. 5, the power transmission antenna 501 is shaped in such a way that the distance between the power transmission antenna 501 and the power reception antenna 502 at the intermediate portion is longer than that at both end portions in the X-axis direction. However, the shape of the power transmission antenna 501 is not limited thereto. The distance between the power transmission antenna 501 and the power reception antenna 502 at either one end portion in the X-axis direction may be longer than that at the intermediate portion. For example, the boundary between the conductor portions 503 and 506 and the boundary between the conductor portions 504 and 505 are bent, as illustrated in FIG. 5, and the boundary between the conductor portions 503 and 507 and the boundary between the conductor portions 504 and 508 may be linearly connected. When the thus-shaped power transmission antenna 501 is used, the coupling factor between antennas can be made smaller than that in a case of using the conventional power transmission antenna 301 at one of the end portions of the power transmission antenna 501 in the X-axis direction where the distance to the power reception antenna 502 is longer than that at the other end portion thereof. This also applies to the power transmission antennas illustrated in FIGS. 8, 9, and 10.

Although, in the system 100 according to the present exemplary embodiment, power is transmitted from the power transmission antenna 501 to the power reception antenna 502, the configuration is not limited thereto. The power transmission side and the power reception side of antennas may be exchanged. More specifically, the system 100 may be configured in such a way that the power transmission antenna 110 is formed of a coil similarly shaped to the power reception antenna 502 illustrated in FIG. 5, the power reception antenna 120 is formed of a coil similarly shaped to the power transmission antenna 501 illustrated in FIG. 5, and power is transmitted from the power transmission antenna 110 to the power reception antenna 120. The above-described configuration makes it possible to prevent a reduction in the power transmission efficiency based on a change in the positional relation between the two antennas, in comparison with a case where the power transmission antenna 110 formed of a coil similarly shaped to the power reception antenna 302 transmits power to the power reception antenna 120 formed of a coil similarly shaped to the power transmission antenna 301. This also applies to the power transmission antennas illustrated in FIGS. 8, 9, and 10.

The present exemplary embodiment has been described above centering on a case where the power transmission antenna 110 is fixed to a printer and the power reception antenna 120 moves in the X-axis direction together with the print head 104. However, the configuration is not limited thereto. The present exemplary embodiment is applicable as long as the positional relation between a power transmission antenna and a power reception antenna is variable in a predetermined direction. For example, there may be a case where the power reception antenna 120 is fixed and the power transmission antenna 110 is movable or a case where both the power transmission antenna 110 and the power reception antenna 120 are movable.

Although the present exemplary embodiment has been described above centering on a case where the power transmission antenna 110 and the power reception antenna 120 are coil-shaped, the shapes of these antennas are not limited thereto. The power transmission antenna 110 and the power reception antenna 120 may be plate-shaped, for example. More specifically, although, in the descriptions in FIGS. 5, 8, 9, and 10, the power transmission antenna 110 and the power reception antenna 120 are coils with wound linear conductors, these antennas may be plate-shaped conductors having similar outlines and planarly formed. Even in a case of using the power transmission antenna 110 and the power reception antenna 120 having the above-described configuration, it is possible to prevent the reduction in the power transmission efficiency based on the positional relation between the two antennas, in comparison with a case where wireless power transmission is performed by using plate-shaped antennas having similar outlines to the coils illustrated in FIG. 3.

As described above, the system 100 according to the present exemplary embodiment includes a first antenna and a second antenna, where the position of the second antenna relative to the first antenna is variable in a predetermined direction, and the first antenna performs wireless power transmission with the second antenna. The system 100 applies a voltage to either one of the first and the second antennas which wirelessly transmits power, and power transmitted from one antenna according to the voltage application is received by the other antenna. The first antenna is longer in length in the predetermined direction than the second antenna. More specifically, the first antenna is shaped in such a way that the distance between at least one end portion of the first antenna in the predetermined direction and the second antenna closest to the end portion, is longer the distance between the intermediate portion of the first antenna in the predetermined direction and the second antenna closest to the intermediate portion. This enables reducing the amount of change in the coupling factor between antennas accompanying a change in positional relation between the first antenna and the second antenna. As a result, when performing wireless power transmission between two antennas, it is possible to prevent the reduction in the power transmission efficiency based on the positional relation between the two antennas.

The first exemplary embodiment has been described above centering on a method for preventing the increase in the coupling factor when a power reception antenna is positioned in the vicinity of an end portion of a power transmission antenna. This method uses a power transmission antenna shaped in such a way that the distance between each end portion and the power reception antenna is longer than the distance between the intermediate portion and the power reception antenna. On the other hand, a second exemplary embodiment will be described below centering on a configuration in which the coupling factor is increased when the power reception antenna is positioned in the vicinity of the intermediate portion of the power transmission antenna to reduce the difference from the coupling factor when the power reception antenna is positioned in the vicinity of each end portion of the power transmission antenna. The configuration of the system 100 according to the second exemplary embodiment is similar to that according to the first exemplary embodiment except for the power transmission antenna 110. The second exemplary embodiment will be described below centering on differences from the first exemplary embodiment in terms of the power transmission antenna 110.

The power transmission antenna 110 according to the present exemplary embodiment will be described below with reference to FIG. 11. The power transmission antenna 110 is formed of a power transmission antenna 1101, and a magnetic body 1103 is positioned in the vicinity of the power transmission antenna 1101. According to the present exemplary embodiment, a sheet-shaped ferrite as the magnetic body 1103 having long sides approximately parallel in the X-axis direction in the coordinate system 170 is stuck to a substrate with the power transmission antenna 1101 installed thereon. However, the shape and material of the magnetic body 1103 are not limited thereto. The power transmission antenna 1101 and the power reception antenna 1102 have similar shapes to the power transmission antenna 301 and the power reception antenna 302, respectively, described above with reference to FIG. 3.

Figure 11:
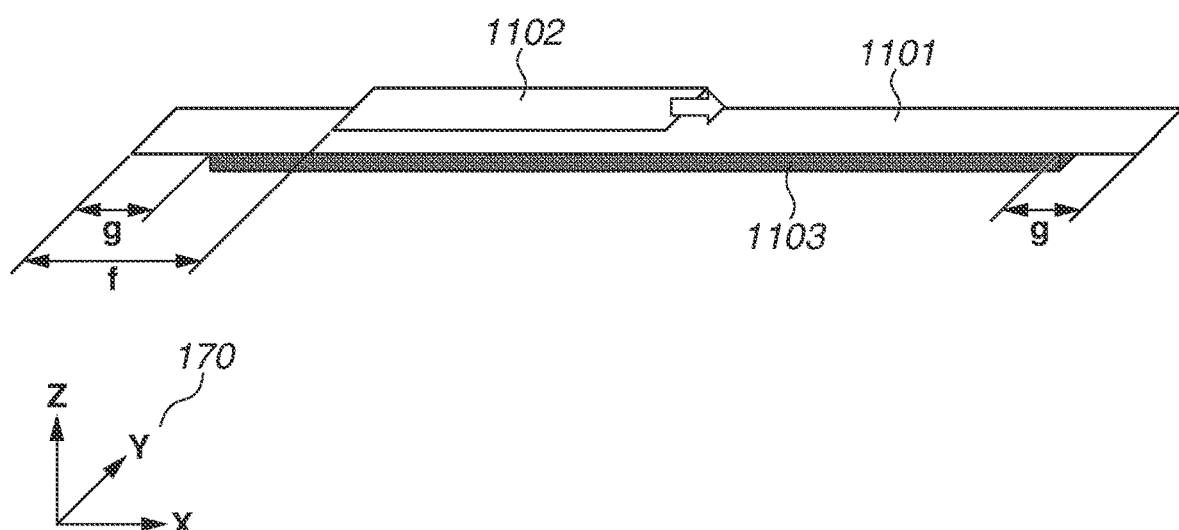
FIG. 11 illustrates a power transmission antenna and a power reception antenna according to an exemplary embodiment.

As illustrated in FIG. 11, the power transmission antenna 1101 is a long coil having long sides approximately parallel in the X-axis direction. The magnetic body 1103 is shorter in length in the X-axis direction than the power transmission antenna 1101, and is not stuck on the portion corresponding to either end portion of the power transmission antenna 1101 on the substrate. Thus, the portions corresponding to both end portions of the power transmission antenna 1101 out of the plane surrounded by the power transmission antenna 1101 do not overlap with the magnetic body 1103 when viewed from the Z-axis direction. More specifically, the magnetic body 1103 is not positioned in the vicinity of either end portion of the power transmission antenna 1101 in the X-axis direction but positioned in the vicinity of the intermediate portion of the power transmission antenna 1101 in the X-axis direction.

According to the present exemplary embodiment, each end portion of the power transmission antenna 1101 in the X-axis direction refers to a portion corresponding to a range g from an edge in the X-axis direction toward the inside of the power transmission antenna 1101 within a predetermined distance. Further, each end portion of the power transmission antenna 1101 in the X-axis direction is also a part of the power transmission antenna 1101 overlapping with the power reception antenna 1102 when viewed from the Z-axis direction when the power reception antenna 1102 moves to the edge of a movable range in the X-axis direction. The intermediate portion of the power transmission antenna 1101 in the X-axis direction refers to the portion other than the portions corresponding to the ranges g of the power transmission antennas 1101 illustrated in FIG. 11, and also refers to a portion corresponding to ranges from the center of the power transmission antenna 1101 in the X-axis direction within a predetermined distance. The stability of the coupling factor between antennas depends on a method for determining the predetermined distance (length of each end portion). The method will be described below with reference to FIG. 13.

The present exemplary embodiment assumes a case where the magnetic body 1103 is stuck only on the portion corresponding to the intermediate portion of the power transmission antenna 1101 on the substrate as a situation where the magnetic body 1103 is not positioned in the vicinity of either end portion of the power transmission antenna 1101 but positioned in the vicinity of the intermediate portion. However, the configuration is not limited thereto. The magnetic body 1103 needs to be installed so that the distance between each end portion of the power transmission antenna 1101 and the magnetic body 1103 is longer than the distance between the intermediate portion thereof and the magnetic body 1103. For example, the substrate with the power transmission antenna 1101 installed thereon does not need to be in contact with the magnetic body 1103.

Figure 12:
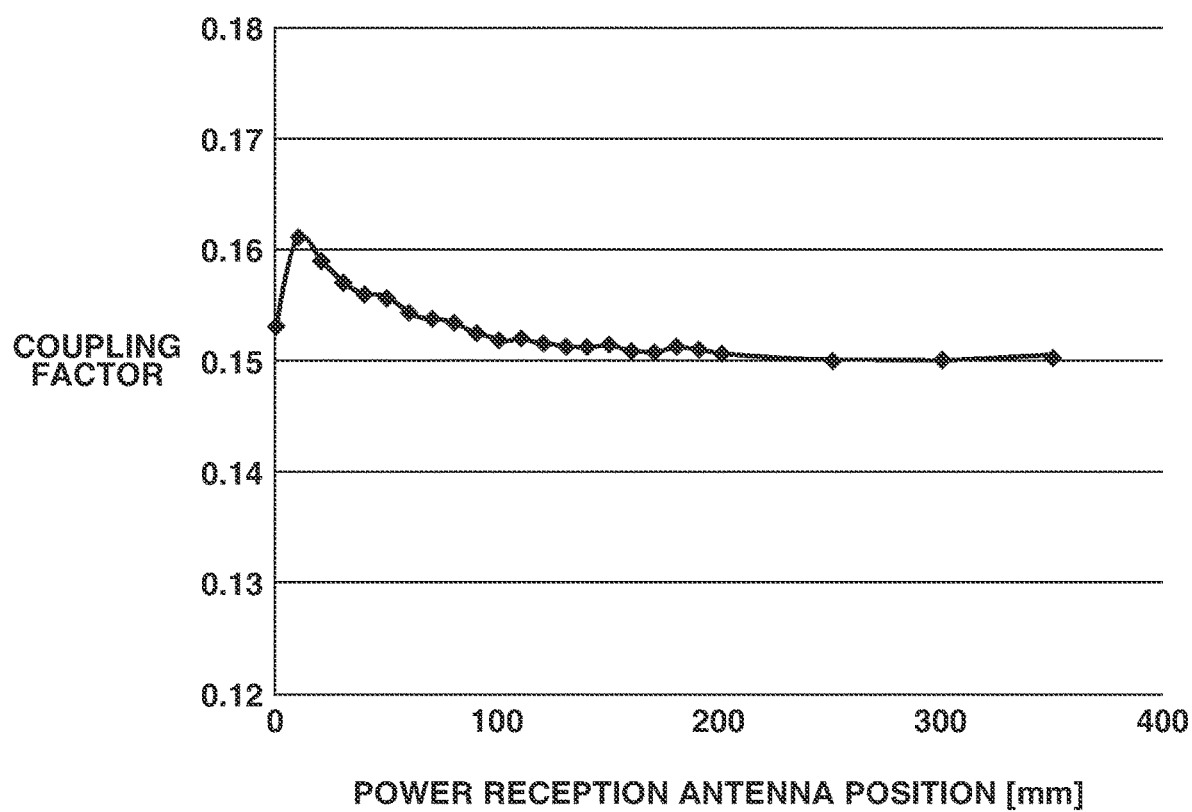
FIG. 12 illustrates a relation between a relative position between a first antenna and a second antenna, and a coupling factor between the two antennas, according to an exemplary embodiment.

The power reception antenna 1102 moves in the vicinity of the power transmission antenna 1101 in the X-axis direction so that the plane surrounded by the power reception antenna 1102 at least partly overlaps with the plane surrounded by the power transmission antenna 1101 when viewed from the Z-axis direction. FIG. 12 illustrates a result of a simulation related to a change in the coupling factor when the power reception antenna 1102 moves in the X-axis direction. The vertical axis denotes the coupling factor between antennas, and the horizontal axis denotes the power reception antenna position in the X-axis direction (corresponding to a range f illustrated in FIG. 11). Similar to the power transmission antenna 301 illustrated in FIG. 3, the power transmission antenna 1101 is 800 mm long in the X-axis direction and 70 mm wide in the Y-axis direction. The power reception antenna 1102 is 100 mm long in the X-axis direction and 70 mm wide in the Y-axis direction. Both the power transmission antenna 1101 and the power reception antenna 1102 have a number of turns 1 (1 turn).

As illustrated in FIG. 12, the coupling factor is high when the power reception antenna 1102 is positioned in the vicinity of an end portion of the power transmission antenna 1101, and decreases as the power reception antenna 1102 approaches the center of the power transmission antenna 1101. However, the coupling factor when the power reception antenna 1102 is positioned in the vicinity of the center of the power transmission antenna 1101 is longer than the coupling factor between conventional antennas in a similar case to that illustrated in FIG. 4. Referring to FIG. 12, the difference between the maximum and minimum values of the coupling factor is about 0.010. More specifically, using the power transmission antenna 110 with which the magnetic body 1103 is not positioned in the vicinity of either end portion of the power transmission antenna 1101 but positioned in the vicinity of the intermediate portion thereof, instead of the conventional power transmission antenna 110, enables reducing the amount of change in the coupling factor with the movement of the power reception antenna 1102. As a result, it becomes possible to prevent the reduction in the power transmission efficiency based on the positional relation between the two antennas. The conventional power transmission antenna 110 according to the present exemplary embodiment refers to the power transmission antenna 110 with which a magnetic body is not positioned in the vicinity of the power transmission antenna 301.

Figure 13:
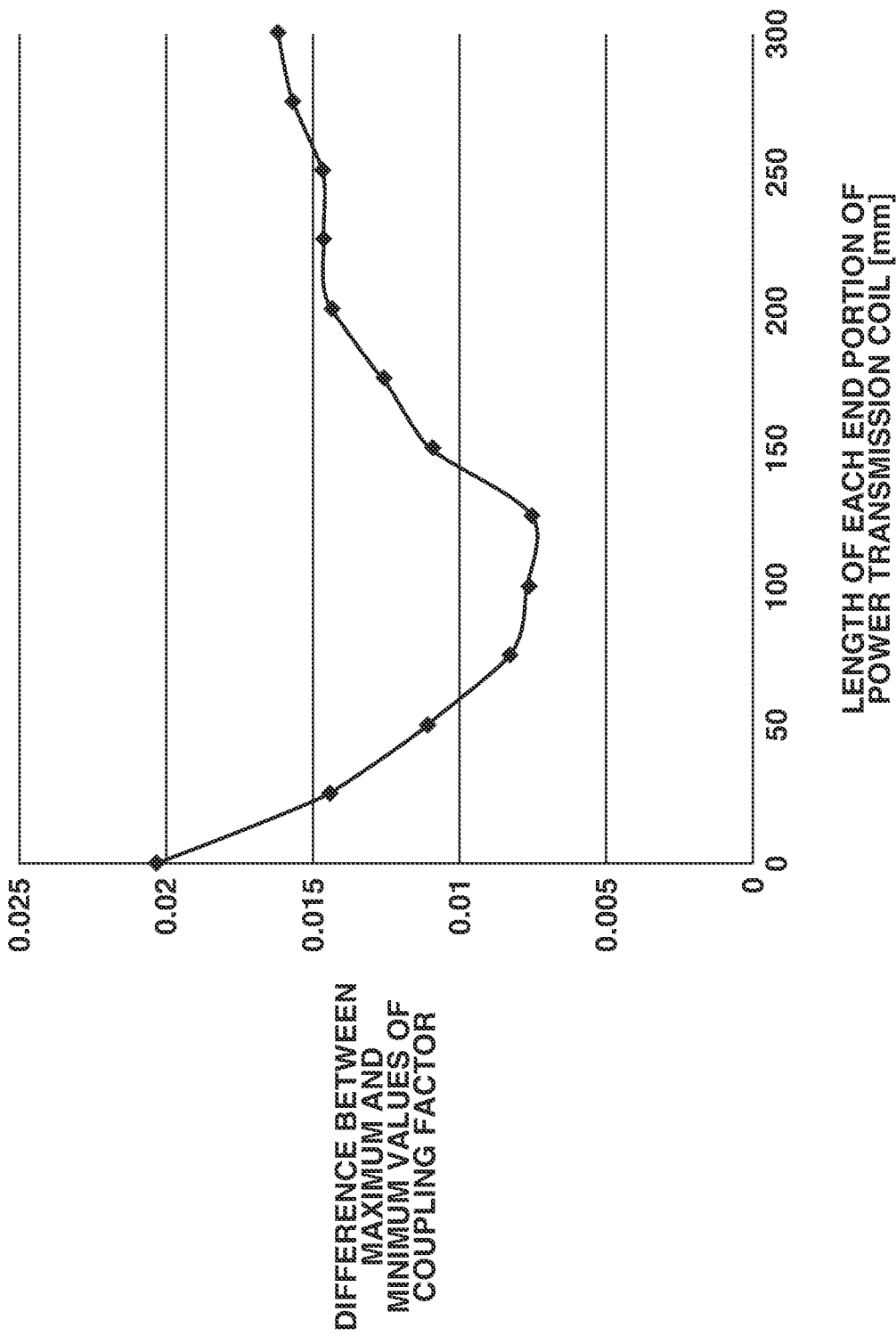
FIG. 13 illustrates a difference between a maximum value and a minimum value of a coupling factor.

FIG. 13 illustrates a result of a simulation related to change in the difference between the maximum and minimum values of the coupling factor when the length of the power transmission antenna 1101 is fixed to 800 mm and the length of each end portion of the power transmission antenna 1101 in the X-axis direction (corresponding to the range g illustrated in FIG. 11) is changed from 0 to 300 mm. As illustrated in FIG. 13, when each end portion of the power transmission antenna 1101 is 50 to 200 mm long, the difference between the maximum and minimum values of the coupling factor is small. When the each end portion of the power transmission antenna 1101 is 75 to 125 mm long, the difference between the maximum and minimum values of the coupling factor is particularly small. The relation between the length of each end and the difference between the maximum and minimum values of the coupling factor is determined by the length of the power reception antenna 1102 in the X-axis direction. More specifically, the coupling factor between antennas is stable when the length of the end portion of the power transmission antenna 1101 in the X-axis direction is about half to twice the length of the power reception antenna 1102 in the X-axis direction. Further, the coupling factor between antennas is stable when the length of each end portion of the power transmission antenna 1101 in the X-axis direction is about ¾ to ⁵⁄₄ times the length of the power reception antenna 1102 in the X-axis direction.

In the power transmission antenna 110 described above with reference to FIG. 11, the magnetic body 1103 is not positioned in the vicinity of either end portion of the power transmission antenna 1101 but positioned in the vicinity of the intermediate portion of the power transmission antenna 1101. Accordingly, the magnetic body 1103 is shorter in length in the X-axis direction than the power transmission antenna 1101. However, the configuration is not limited thereto. The magnetic body 1103 may not be positioned in the vicinity of either one end portion of the power transmission antennas 1101 but positioned in the vicinity of the other end portion and the intermediate portion. More specifically, on the substrate with the power transmission antenna 1101 installed thereon, the magnetic body 1103 may be stuck on the portion corresponding to other one end portion of the power transmission antenna 1101. When the thus-configured power transmission antenna 110 is used, the difference between the coupling factor at one of the end portions of the power transmission antenna 1101 where the magnetic body 1103 is not positioned and the coupling factor at the intermediate portion thereof can be reduced, in comparison with a case of using the conventional power transmission antenna 110.

Figure 14:
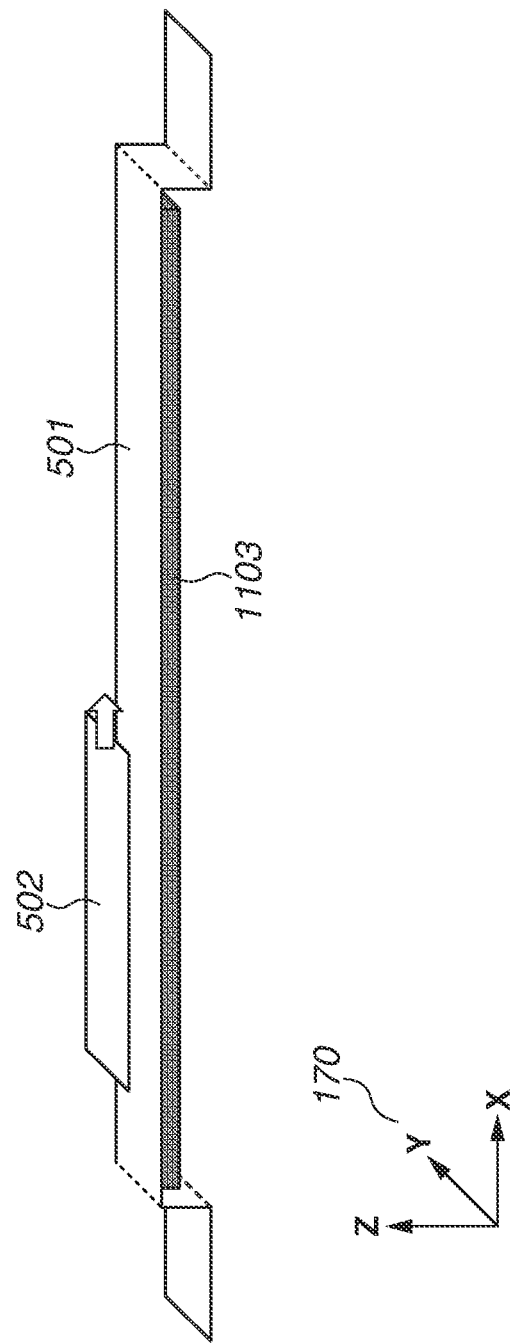
FIG. 14 illustrates a power transmission antenna and a power reception antenna according to an exemplary embodiment.

The configuration of the power transmission antenna 110 according to the present exemplary embodiment may be employed together with the shape of the power transmission antenna 110 according to the first exemplary embodiment. For example, as illustrated in FIG. 14, it is also possible to use the power transmission antenna 110 with which the magnetic body 1103 is positioned in the vicinity of an end portion of the power transmission antenna 501 (described above with reference to FIG. 5) in the X-axis direction, and the magnetic body 1103 is positioned in the vicinity of the intermediate portion of the power transmission antenna 501 in the X-axis direction. When the thus-configured power transmission antenna 110 is used, the coupling factor between antennas can be further stabilized making it possible to further prevent the reduction in the wireless power transmission efficiency, in comparison with a case of using the power transmission antenna 110 described in FIGS. 5 and 11.

Figure 15:
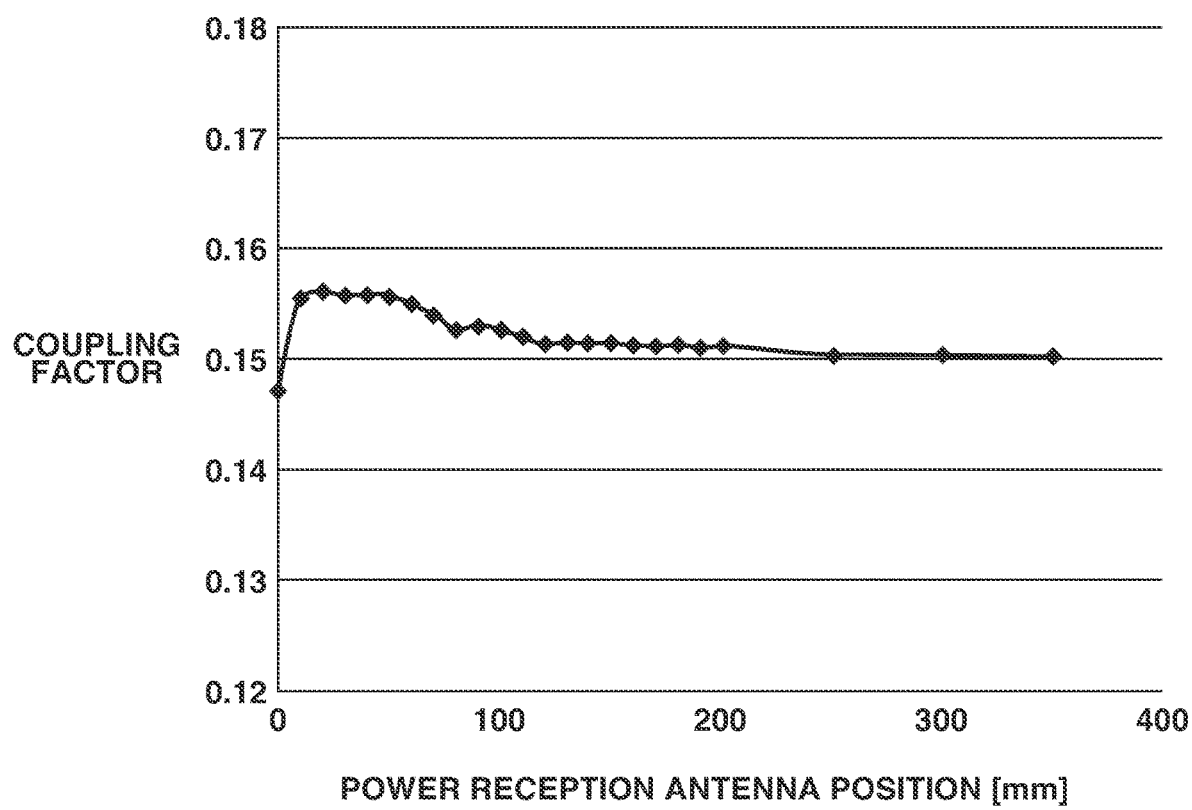
FIG. 15 illustrates a relation between a relative position between a first antenna and a second antenna, and a coupling factor between the two antennas, according to an exemplary embodiment.

FIG. 15 illustrates a result of a simulation related to the relation between the power reception antenna position and the coupling factor in a case of using the power transmission antenna 110 having the configuration illustrated in FIG. 14. Referring to FIG. 15, the difference between the maximum and minimum values of the coupling factor is about 0.009. Also with the power transmission antennas illustrated in FIGS. 8, 9, and 10, the magnetic body 1103 is installed in the vicinity of the intermediate portion in the X-axis direction but not installed in the vicinity of either end portion in the X-axis direction. This enables further preventing the reduction in the wireless power transmission efficiency.

The present exemplary embodiment has been described above centering on a case where a magnetic body is not stuck an the position corresponding to either end portion of the power transmission antenna 1101 in the X-axis direction on the substrate with the power transmission antenna 1101 installed thereon. However, the configuration is not limited thereto. A magnetic body having low magnetic permeability may be stuck at the positions corresponding to both end portions of the power transmission antenna 1101 on the substrate. More specifically, another magnetic body, having lower magnetic permeability than that of the magnetic body 1103 positioned in the vicinity of the intermediate portion of the power transmission antenna 1101 in the X-axis direction, may be positioned in the vicinity of an end portion of the power transmission antenna 1101 in the X-axis direction.

The thus-configured power transmission antenna 110 will be described below with reference to FIG. 16. In addition to the magnetic body 1103, magnetic bodies 1601 and 1602 are positioned in the vicinity of the power transmission antenna 1101. As illustrated in FIG. 16, the portions corresponding to both end portions in the X-axis direction out of the plane surrounded by the power transmission antenna 1101 overlaps with the magnetic body 1601 or 1602 when viewed from the Z-axis direction in the coordinate system 170. The magnetic bodies 1601 and 1602 have lower magnetic permeability than that of the magnetic body 1103. Although, the present exemplary embodiment, the magnetic bodies 1601 and 1602 are considered to have equal magnetic permeability, the magnetic bodies 1601 and 1602 may have different magnetic permeability. When the magnetic body 1103 is positioned in the vicinity of one end portion of the power transmission antenna 1101 in the X-axis direction, the magnetic body 1601 or 1602 needs to be positioned in the vicinity of the other end portion thereof.

Even when the thus-configured power transmission antenna 110 is used, it is possible to reduce the amount of change in the coupling factor with the movement of the power reception antenna 1102 to prevent the reduction in the power transmission efficiency based on the positional relation between two antennas, in comparison with a case of using the conventional power transmission antenna 110. Further, in a case where a metallic object exists in the vicinity of the power transmission antenna 1101, positioning a magnetic body in the vicinity of the entire power transmission antenna 1101 enables reducing the influence of an AC magnetic field generated from the power transmission antenna 1101 on the metal. This configuration makes it possible to reduce an eddy current generated in the metal by the influence of the AC magnetic field to prevent the reduction in the wireless power transmission efficiency under the influence of the eddy current.

Similar to the system 100 according to the first exemplary embodiment, the power transmission side and the power reception side of antennas may be exchanged in the system 100 according to the present exemplary embodiment. Further, there may be a case where the power transmission antenna 110 is movable instead of the power reception antenna 120 or a case where both the power transmission antenna 110 and the power reception antenna 120 are movable.

As described above, the system 100 according to the present exemplary embodiment includes a first antenna and a second antenna, where the position of the second antenna relative to the first antenna is variable in a predetermined direction, and the first antenna performs wireless power transmission with the second antenna. The first antenna is longer in length in the predetermined direction than the second antenna. The system 100 includes a magnetic body which is not positioned in the vicinity of at least one end portion of the first antenna in the predetermined direction but positioned in the vicinity of the intermediate portion of the first antenna in the predetermined direction. The system 100 applies a voltage to either one of the first and the second antennas which wirelessly transmits power. Power transmitted from one antenna according to the voltage application is received by the other antenna. This enables reducing the amount of change in the coupling factor between antennas accompanying change in positional relation between the first and the second antennas. As a result, when performing wireless power transmission between two antennas, it is possible to prevent the reduction in the power transmission efficiency based on the positional relation between the two antennas.

Figure 17:
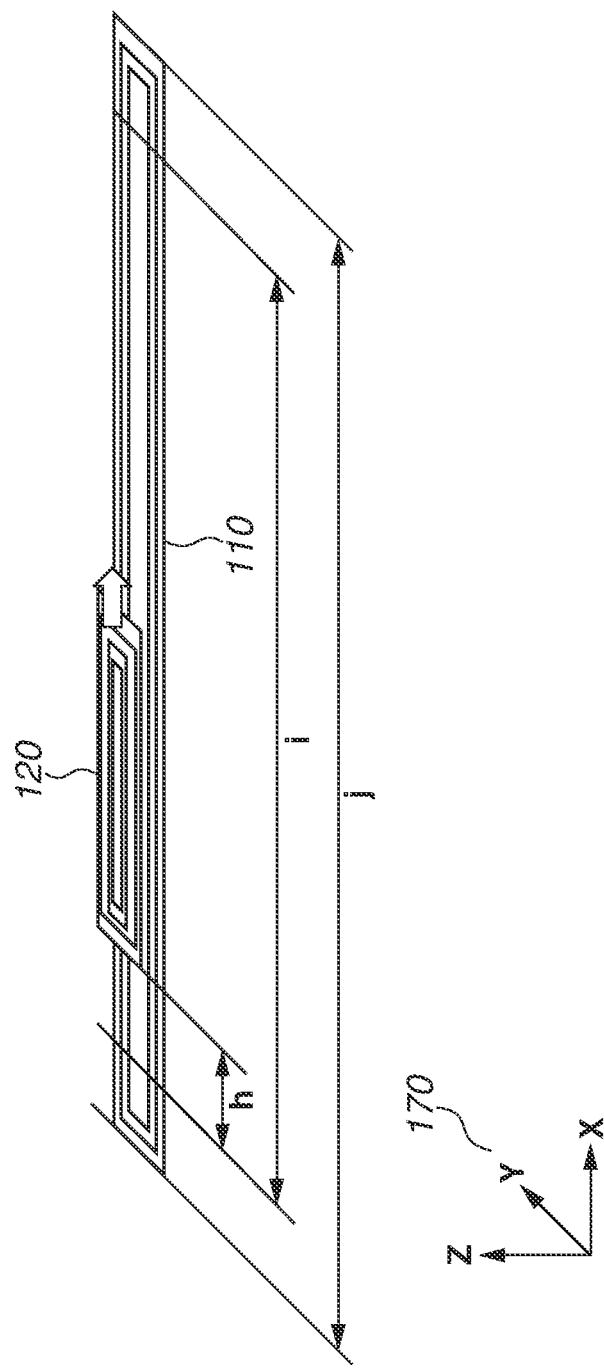
FIG. 17 illustrates a power transmission antenna and a power reception antenna according to an exemplary embodiment.

In a third exemplary embodiment described below, the configuration of the system 100 is similar to that described above with reference to FIG. 1. FIG. 17 illustrates the power transmission antenna 110 and the power reception antenna 120 included in the system 100 according to the third exemplary embodiment. The power reception antenna 120 moves on the power transmission antenna 110 in the X-axis direction so that the plane surrounded by the coil of the power reception antenna 120 at least partly overlaps with the plane surrounded by the coil of the power transmission antenna 110 when viewed from the Z-axis direction in the coordinate system 170. To prevent change in the coupling factor with the movement of the power reception antenna 120, the power transmission antenna 110 is shaped to be longer in the X-axis direction than the moving range of the power reception antenna 120. More specifically, the power reception antenna 120 moves on the intermediate portion corresponding to a range i illustrated in FIG. 17 excluding the vicinity of both end portions in the X-axis direction out of the power transmission antennas 110 having a length indicated by a range j illustrated in FIG. 17. According to the present exemplary embodiment, both end portions of the power transmission antenna 110 refer to areas having a predetermined width from the edges of the power transmission antenna 110 toward the inside of the power transmission antenna 110 (areas on the outside of the portions corresponding to the range illustrated in FIG. 17 out of the power transmission antennas 110).

More specifically, within the moving range of the power reception antenna 120, the power reception antenna 120 does not face either end portion of the power transmission antenna 110 in the X-axis direction but faces the intermediate portion, i.e., the portion of the power transmission antenna 110 excluding both end portions thereof. According to the present exemplary embodiment, a state where the power reception antenna 120 faces the intermediate portion of the power transmission antenna 110 means a state where the plane surrounded by the coil of the power transmission antenna 110 excluding both end portions thereof at least partly overlaps with the plane surrounded by the coil of the power reception antenna 120 when viewed from the Z-axis direction. A state where the power reception antenna 120 does not face either end portion of the power transmission antenna 110 means a state where both end portions of the plane surrounded by the coil of the power transmission antenna 110 do not overlap with the plane surrounded by the coil of the power reception antenna 120 when viewed from the Z-axis direction.

In other words, within the moving range of the power reception antenna 120, both end portions of the power transmission antenna 110 in the X-axis direction do not overlap with the power reception antenna 120 when viewed from the Z-axis direction. From the viewpoint of the Z-axis direction, both end portions of the power reception antenna 120 in the X-axis direction are positioned within the range between both end portions of the power transmission antenna 110 in the X-axis direction.

Figure 18:
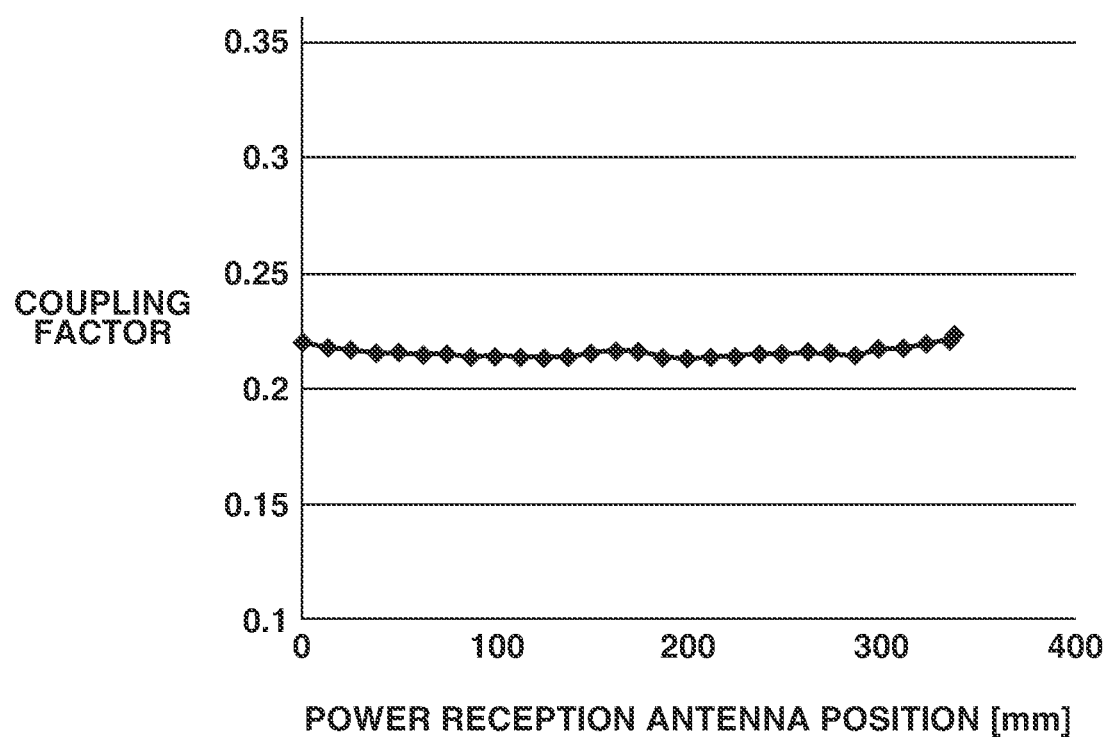
FIG. 18 illustrates a relation between a relative position between a first antenna and a second antenna, and a coupling factor between the two antennas, according to an exemplary embodiment.

FIG. 18 is a graph illustrating a result of a simulation for obtaining the relation between the relative position and the coupling factor between the power transmission antenna 110 and the power reception antenna 120 illustrated in FIG. 17. The vertical axis denotes the coupling factor between antennas, and the horizontal axis denotes the position of the power reception antenna 120 (power reception antenna position) relative to the power transmission antenna 110 in the X-axis direction. The power reception antenna position illustrated in FIG. 18 corresponds to a range h illustrated in FIG. 17. In the simulation illustrated in FIG. 18, the power transmission antenna 110 is 500 mm long in the X-axis direction and 70 mm wide in the Y-axis direction, and has a number of turns of 3 (3 turns). The power reception antenna 120 is 60 mm long in the X-axis direction and 70 mm wide in the Y-axis direction, and has a number of turns of 4 (4 turns). The interval between antennas in the Z-axis direction is 1 mm. The Q value of the power transmission antenna 110 and the Q value of the power reception antenna 120 are 200, respectively.

As illustrated in FIG. 18, in the moving range of the power reception antenna 120, the difference between the maximum and minimum values of the coupling factor is about 0.02. The amount of change in the coupling factor with the movement of the power reception antenna 120 is small. Thus, impedance matching is not largely disrupted by a movement the power reception antenna 120.

Figure 19:
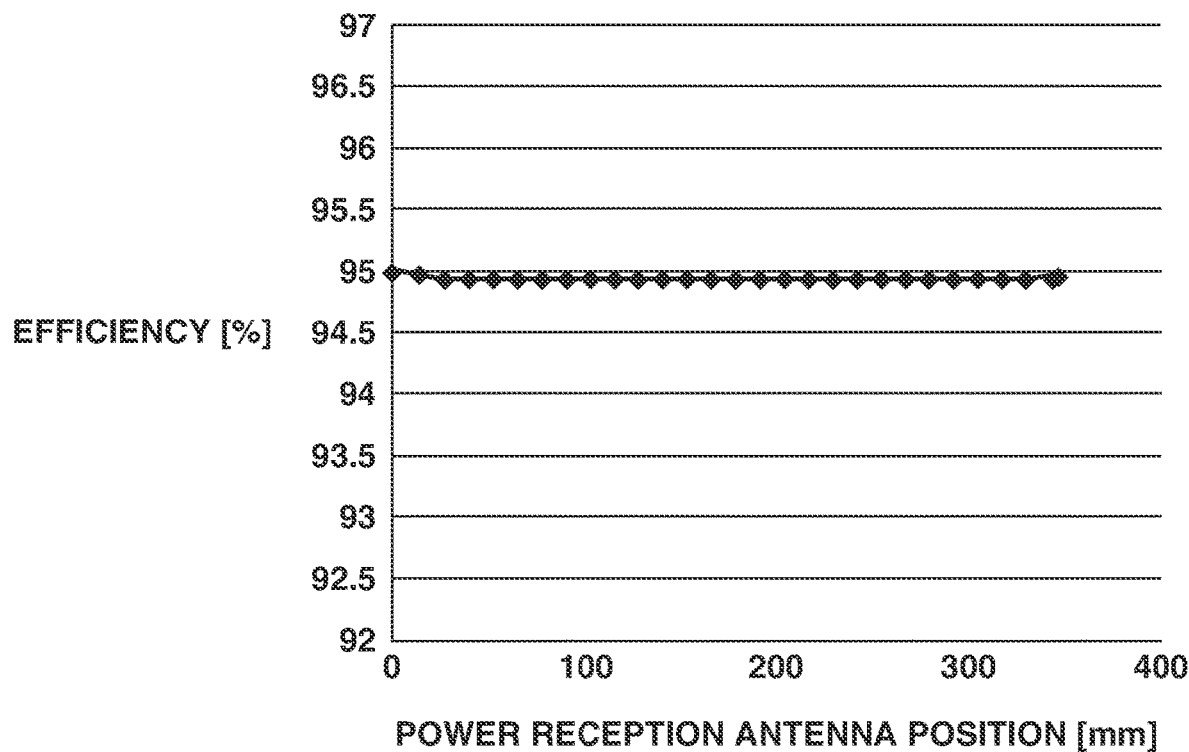
FIG. 19 illustrates a relation between a relative position between two antennas and a power transmission efficiency according to an exemplary embodiment.

FIG. 19 is a graph illustrating a result of a simulation for obtaining the relation between the relative position between the power transmission antenna 110 and the power reception antenna 120 illustrated in FIG. 17 and the power transmission efficiency. The vertical axis denotes the power transmission efficiency in the power transmission between antennas, and the horizontal axis denotes the power reception antenna position. As illustrated in FIG. 19, in the moving range of the power reception antenna 120, the difference between the maximum and minimum values of the power transmission efficiency is as small as 0.05%, i.e., the power transmission efficiency is approximately constant. Performing wireless power transmission by using the power transmission antenna 110 and the power reception antenna 120 according to the present exemplary embodiment instead of conventional antennas enables reducing the possibility that the power transmission efficiency becomes unstable with the movement of the power reception antenna 120.

When the power transmission antenna 110 is short in length in the X-axis direction, the coupling factor between antennas is high. Thus, particularly in a wireless power transmission system with which the stability is demanded more than the degree of the power transmission efficiency, it is effective to make the power transmission antenna 110 longer than the moving range of the power reception antenna 120 as in the present exemplary embodiment.

As described above, configuring the system 100 so that both end portions of the power transmission antenna 110 in the X-axis direction do not overlap with the power reception antenna 120 when viewed from the Z-axis enables improving the stability of the power transmission efficiency. The stability of the power transmission efficiency differs according to the length of both end portions of the power transmission antenna 110 in the X-axis direction, i.e., the length of the portions not facing the power reception antenna 120 out of the power transmission antennas 110.

Figure 20:
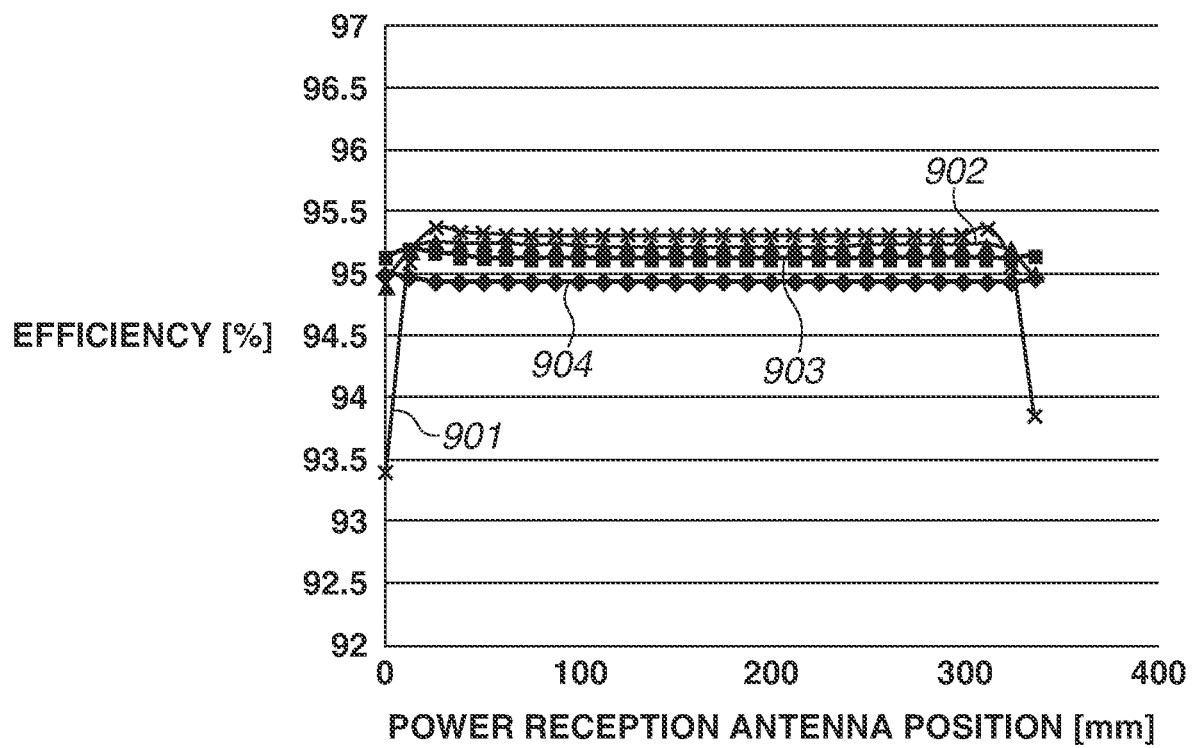
FIG. 20 illustrates a relation between a relative position between two antennas and a power transmission efficiency according to an exemplary embodiment.

FIG. 20 illustrates a result of a simulation for obtaining the relation between the relative position between antennas and the power transmission efficiency when the length of the moving range of the power reception antenna 120 is fixed and the length of the power transmission antenna 110 is changed to four different lengths, 425, 450, 475, and 500 mm. Each end portion of the power transmission antenna 110 is 12.5, 25, 37.5, or 50 mm long when the power transmission antennas 110 is 425, 450, 475, or 500 mm long, respectively. Referring to FIG. 20, the vertical axis denotes the power transmission efficiency in the power transmission between antennas, and the horizontal axis denotes the power reception antenna position. A series 901 denotes the power transmission efficiency when the power transmission antenna 110 is 425 mm long. A series 902 denotes the power transmission efficiency when the power transmission antenna 110 is 450 mm long. A series 903 denotes the power transmission efficiency when the power transmission antenna 110 is 475 mm long. A series 904 denotes the power transmission efficiency when the power transmission antenna 110 is 500 mm long.

Referring to FIG. 20, the difference between the maximum and minimum values of the power transmission efficiency is 1.9% when the power transmission antenna 110 is 425 mm long, and is 0.34% when the power transmission antenna 110 is 450 mm long. When the power transmission antennas 110 is 475 or 500 mm long, the differences between the maximum and minimum values of the power transmission efficiency is 0.05%.

As illustrated in FIG. 20, when the moving range of the power reception antenna 120 is fixed, the stability of the power transmission efficiency increases with increasing length of the power transmission antenna 110. More specifically, the transmission efficiency is stable when the power transmission antenna 110 is 450 mm long or longer, and is particularly stable when the power transmission antenna 110 is 475 mm long or longer. The relation between the length of the power transmission antenna 110 and the difference between the maximum and minimum values of the power transmission efficiency is determined by the length of the power reception antenna 120 in the X-axis direction. Accordingly, it can be said that the power transmission efficiency is particularly stable when the difference between the length of the power transmission antenna 110 (corresponding to a range illustrated in FIG. 17) and the length of the range in which the movable power reception antenna 120 can be positioned (corresponding to the range i illustrated in FIG. 17) is approximately equal to or larger than the length of the power reception antenna 120 in the X-axis direction. In this case, the length of each end portion of the power transmission antenna 110 in the X-axis direction is half the length of the power reception antenna 120 in the X-axis direction or longer.

However, a method for determining the length of each end portion is not limited thereto. For example, in a system with which the coupling factor is required to be within a predetermined range based on the stability of the demanded power transmission efficiency, the length of each end portion needs to be set as follows. More specifically, in a case where the power reception antenna 120 does not face either end portion of the power transmission antenna 110 but faces the intermediate portion of the power transmission antenna 110, the length of each end portion of the power transmission antenna 110 needs to be set so that the coupling factor falls within a predetermined range.

Figure 21:
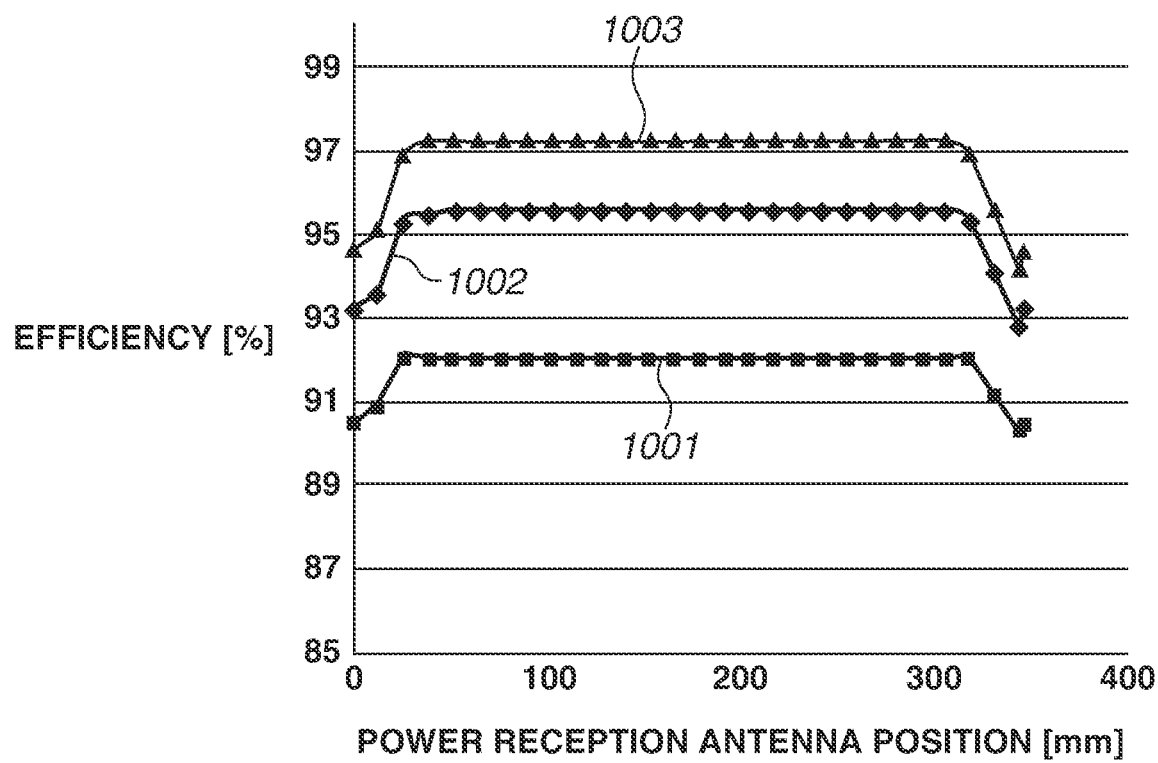
FIG. 21 illustrates a relation between a relative position between two antennas and a power transmission efficiency according to an exemplary embodiment.

The stability of the power transmission efficiency can be improved not only by increasing the length of the power transmission antenna 110 relative to the moving range of the power reception antenna 120 but also by decreasing the Q values of the antennas. FIG. 21 is a graph illustrating a result of a simulation for obtaining the relation between the relative position between antennas and the power transmission efficiency when the Q values of the power transmission antenna 301 and the power reception antenna 302 are changed to three different values, 100, 200, and 300 in the configuration illustrated in FIG. 3. A series 1001 denotes the power transmission efficiency when the Q value is 100, a series 1002 denotes the power transmission efficiency when the Q value is 200, and a series 1003 denotes the power transmission efficiency when the Q value is 300.

Referring to FIG. 21, the difference between the maximum and minimum values of the power transmission efficiency is 1.7% when the Q value is 100, 2.7% when the Q value is 200, and 3.0% when the Q value is 300. As illustrated in FIG. 21, the stability of the power transmission efficiency can be improved by reducing the Q values of the power transmission antenna 301 and the power reception antenna 302. The Q values of the power transmission antenna 301 and the power reception antenna 302 may be different. The stability of the power transmission efficiency can also be further improved to a further extent by making the length of the power transmission antenna 110 longer than the moving range of the power reception antenna 120 and reducing at least either one of the Q values of the power transmission antenna 110 and the power reception antenna 120 as illustrated in FIG. 17.

In the case described above with reference to FIG. 17, the length of the power transmission antenna 110 in the X-axis direction is considered to be longer than the moving range of the power reception antenna 120. More specifically, in the above-described case, the drive unit 105 moves the position of the power reception antenna 120 within a predetermined range where both end portions of the power transmission antenna 110 do not face the power reception antenna 120 and the intermediate portion of the power transmission antenna 110 faces the power reception antenna 120. However, the configuration is not limited thereto. The system 100 needs to be configured so that wireless power transmission is performed between the power reception antenna 120 and the power transmission antenna 110 relatively positioned within the above-described predetermined range. Examples of other configurations for implementing the wireless power transmission will be described below.

As one of other example configurations, the drive unit 105 may move the position of the power reception antenna 120 so that the power reception antenna 120 is positioned within the above-described predetermined range in a period in which a voltage is applied to the power transmission antenna 110 by the power transmitter 111. Then, the drive unit 105 may move the power reception antenna 120 out of the predetermined range in a period in which a voltage is not applied to the power transmission antenna 110. The system 100 to which this example configuration is applied makes it possible to improve the stability of the power transmission efficiency during wireless power transmission to a further extent than in a conventional case.

As an application target of this example configuration, suppose a case where power received by the power reception antenna 120 is used to control the ink discharge by the print head 104 as in the system 100 according to the present exemplary embodiment described above with reference to FIG. 1. In this case, stable power transmission between antennas needs to be performed in a period in which the print head 104 is discharging ink and does not need to be performed in a period in which the print head 104 is not discharging ink. Thus, in a period in which neither ink is being discharged nor power transmission is being performed, the drive unit 105 may move the print head 104 up to a storage position of the print head 104 where an end portion of the power transmission antenna 110 faces the power reception antenna 120.

As another example configuration, the timing of voltage application by the power transmitter 111 may be controlled not to apply the voltage to the power transmission antenna 110 while the power reception antenna 120 is positioned out of the predetermined range. The system 100 to which this example configuration is applied also makes it possible to improve the stability of the power transmission efficiency during wireless power transmission to a further extent than in a conventional case.

As an application target of this example configuration, in the system 100, the power reception unit 102 may have a battery for accumulating received power. In this case, when the power reception antenna 120 is positioned out of the predetermined range, the power transmitter 111 may not apply a voltage but the print head 104 may control the ink discharge by using power accumulated in the battery. For example, in a case of applying the system 100 to the power transmission to an AGV used at a factory, the system 100 may perform the following control. When the power reception antenna 120 is within the above-described predetermined range, the system 100 transmits power to the AGV. When the power reception antenna 120 is out of the predetermined range, the system 100 operates the AGV not by transmitting power thereto but by using the battery.

The power transmission side and the power reception side of antennas may be exchanged in the above-described system 100. More specifically, according to the present exemplary embodiment, the power reception antenna 120 for performing wireless power transmission with the power transmission antennas 110 may be an antenna for receiving power from the power transmission antenna 110 or an antenna for transmitting power to the power transmission antenna 110. As an example in which the power transmission side and the power reception side are exchanged, the power transmission antenna 110 is movable in the X-axis direction like the power reception antenna 120 illustrated in FIG. 17, and the power reception antenna 120 may be longer in length in the X-axis direction than the other antenna like the power transmission antenna 110 illustrated in FIG. 17.

In the above-described case, the power transmission antenna 110 is fixed to the printer, and the power reception antenna 120 moves in the X-axis direction together with the print head 104. However, the configuration is not limited thereto. The present exemplary embodiment is applicable as long as the position of the power reception antenna 120 relative to the power transmission antenna 110 is variable in a predetermined direction. For example, there may be a case where the power reception antenna 120 is fixed and the power transmission antenna 110 is movable or a case where both the power transmission antenna 110 and the power reception antenna 120 are movable. Even in these cases, as described above, the effect of improving the stability of the power transmission efficiency can be acquired.

As described above, the system 100 according to the present exemplary embodiment includes a first antenna and a second antenna, where the position of the second antenna relative to the first antenna is moved in a predetermined direction. The second antenna performs wireless power transmission with the first antenna at a position where the second antenna does not face either end portion of the first antenna in the moving direction but faces the intermediate portion of the first antenna, i.e., the portion of the first antenna excluding both end portions. In a case of moving the position of one of the two antennas for performing wireless power transmission relative to the other antenna, the above-described configuration makes it possible to improve the stability of the power transmission efficiency.

Although the above-described exemplary embodiments have been described centering on a case where both the coil of the power transmission antenna 110 and the coil of the power reception antenna 120 are formed of linear conductor portions, the shapes of these coils are not limited thereto. For example, at least either one of the coil of the power transmission antenna 110 and the coil of the power reception antenna 120 may be round- or oval-shaped. Further, for example, at least either one of the coil of the power transmission antenna 110 and the coil of the power reception antenna 120 may have the shape of a figure eight having two loops in which currents flow in opposite directions. Although, in the present exemplary embodiment, both the power transmission antenna 110 and the power reception antenna 120 are coils each being formed of a wound linear conductor, the configuration is not limited thereto. For example, these antennas may be planarly formed plate-shaped conductors having similar contours.

Figure 22A:
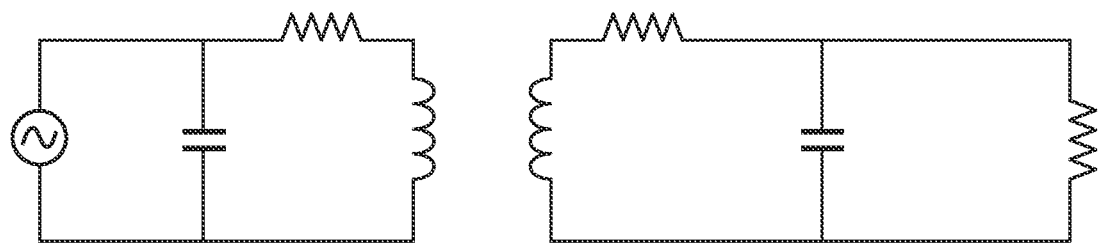
FIGS. 22A, 22B, and 22C are circuit diagrams illustrating modifications of circuit configurations of a power transmission antenna and a power reception antenna.
Figure 22B:
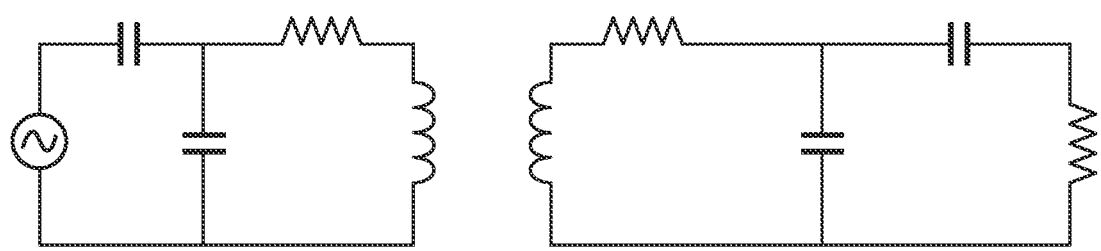
Figure 22C:
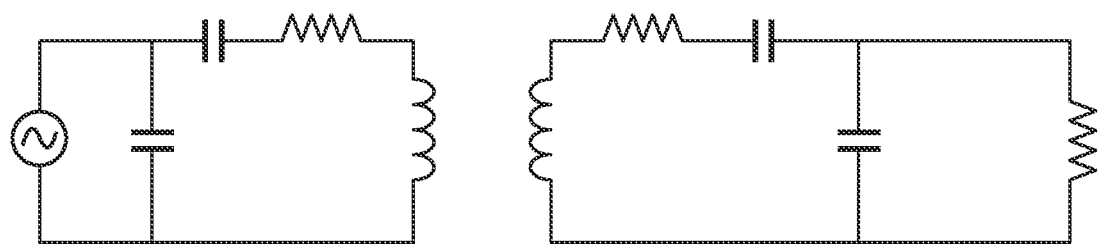

The power transmission unit 101 and the power reception unit 102 in the system 100 do not necessarily have equivalent circuits in which a capacitor performs series resonance with an inductor, as illustrated in FIG. 2. For example, the power transmission unit 101 and the power reception unit 102 may have equivalent circuits illustrated in FIG. 22A to 22C. Even with these configurations, the stability of power transmission efficiency can be improved by applying the present exemplary embodiment.

According to the above-described exemplary embodiments, it is possible to improve the stability of the power transmission efficiency in a case of moving the position of one of the two antennas for performing wireless power transmission relative to the other antenna.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-130602, filed Jun. 30, 2016, and No. 2016-253864, filed Dec. 27, 2016, which are hereby incorporated by reference herein in their entirety.

What is claimed is:

1. A wireless power transmission system comprising:
    a first antenna having a shape of a first loop, wherein a length of the first loop in a first direction is longer than a length of the first loop in a second direction that is perpendicular to the first direction;
    a second antenna having a shape of a second loop;
    a movement control unit configured to cause a relative position between the first antenna and the second antenna to move in a moving direction that is substantially parallel to a longitudinal direction of the first loop, in a situation where the first loop and the second loop at least partially overlap as viewed from a specific direction that is perpendicular to the longitudinal direction of the first loop, wherein a length of the second loop is shorter than a length of the first loop in the moving direction in the situation;
    a restriction unit configured to restrict a moving range, in which the relative position is able to move according to control by the movement control unit, to a predetermined range such that the second loop does not overlap with either end portion in the longitudinal direction of the first loop but overlaps with an intermediate portion of the first loop as viewed from the specific direction, wherein the intermediate portion of the first loop is a portion of the first loop excluding both end portions thereof; and
    a communication control unit configured to control wireless power transmission between the first antenna and the second antenna.

2. The wireless power transmission system according to claim 1, wherein the movement control unit does not cause the relative position to move to a position at which the second loop and either of the end portions of the first loop overlap each other as viewed from the specific direction.

3. The wireless power transmission system according to claim 1, wherein the movement control unit causes the second antenna to move in the moving direction, such that the second loop and either of the end portions of the first loop do not overlap each other but the intermediate portion of the first loop and the second loop overlap each other as viewed from the specific direction while the wireless power transmission between the first antenna and the second antenna is performed.

4. The wireless power transmission system according to claim 1,
wherein the communication control unit controls the wireless power transmission such that the wireless power transmission between the first antenna and the second antenna is not performed while the second loop and one of the end portions of the first loop overlap each other as viewed from the specific direction.

5. The wireless power transmission system according to claim 1, further comprising:
an application unit configured to apply a voltage to the first antenna; and
an output unit configured to output power generated in the second antenna according to application of the voltage to the first antenna by the application unit into a print head of a printer,
wherein, in conjunction with the print head, the second antenna moves in the moving direction.

6. The wireless power transmission system according to claim 1, wherein a length of one of the end portions of the first loop in the longitudinal direction is a length such that a coupling factor between the first and the second antennas is a value within a predetermined range in a case where the second loop and either of the end portions of the first loop do not overlap each other and the intermediate portion of the first loop and the second loop overlap each other as viewed from the specific direction.

7. A control method for controlling a wireless power transmission system comprising a first antenna having a shape of a first loop and a second antenna having a shape of a second loop, the control method comprising:
moving a relative position between the first antenna and the second antenna in a moving direction that is substantially parallel to a longitudinal direction of the first loop, in a situation where the first loop and the second loop at least partially overlap as viewed from a specific direction that is perpendicular to the longitudinal direction of the first loop, wherein a length of the second loop is shorter than a length of the first loop in the moving direction;
restricting a moving range, in which the relative position is able to move, to a predetermined range such that the second loop does not overlap with either end portion in the longitudinal direction of the first loop but overlaps with an intermediate portion of the first loop as viewed from the specific direction, wherein the intermediate portion of the first loop is a portion of the first loop excluding both end portions thereof; and
controlling wireless power transmission between the first antenna and the second antenna.

8. The control method according to claim 7, wherein the relative position moves in the moving direction, such that the second loop and either of the end portions of the first loop do not overlap each other but the intermediate portion of the first loop and the second loop overlap each other as viewed from the specific direction while the wireless power transmission between the first antenna and the second antenna is performed.

9. The control method according to claim 7, further comprising applying a voltage to either one of the first and the second antennas that performs wireless power transmission,
wherein, in the controlling, the voltage application in the applying is controlled so that the voltage is not applied to the one antenna in a case where the second antenna and at least one of the end portions of the first antenna face each other.

10. A non-transitory computer-readable storage medium storing a program for causing a computer to execute a control method for controlling a wireless power transmission system that comprises a first antenna having a shape of a first loop and a second antenna having a shape of a second loop, the control method comprising:
moving a relative position between the first antenna and the second antenna in a moving direction that is substantially parallel to a longitudinal direction of the first loop, in a situation where the first loop and the second loop at least partially overlap as viewed from a specific direction that is perpendicular to the longitudinal direction of the first loop, wherein a length of the second loop is shorter than a length of the first loop in the moving direction;
restricting a moving range, in which the relative position is able to move, to a predetermined range such that the second loop does not overlap with either end portion in the longitudinal direction of the first loop but overlaps with an intermediate portion of the first loop as viewed from the specific direction, wherein the intermediate portion of the first loop is a portion of the first loop excluding both end portions thereof; and
controlling wireless power transmission between the first antenna and the second antenna.

11. The wireless power transmission system according to claim 5,
wherein the restriction unit is a rail along which the print head and the second antenna move in the moving direction, and wherein the moving range is shorter than a length of the first loop in the moving direction.

12. The wireless power transmission system according to claim 1,
wherein a difference between a length of the moving range and a length of the first loop in the moving direction is greater than a length of the second loop in the moving direction.

* * * * *